US011470551B2

(12) United States Patent
Xi et al.

(10) Patent No.: US 11,470,551 B2
(45) Date of Patent: Oct. 11, 2022

(54) METHOD AND APPARATUS FOR PERFORMING DISCONTINUOUS RECEPTION AND/OR DISCONTINUOUS TRANSMISSION FOR A MULTI-CARRIER/MULTI-CELL OPERATION

(71) Applicant: INTERDIGITAL PATENT HOLDINGS, INC., Wilmington, DE (US)

(72) Inventors: Fengjun Xi, San Diego, CA (US);
Diana Pani, Montreal (CA);
Christopher R Cave, Dollard-des-Ormeaux (CA); Benoit Pelletier, Roxboro (CA); Lujing Cai, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 152 days.

(21) Appl. No.: 14/507,468

(22) Filed: Oct. 6, 2014

(65) Prior Publication Data
US 2015/0023177 A1   Jan. 22, 2015

Related U.S. Application Data

(63) Continuation of application No. 12/987,013, filed on Jan. 7, 2011, now Pat. No. 8,854,976.
(Continued)

(51) Int. Cl.
*H04W 52/02* (2009.01)
*H04L 5/00* (2006.01)
*H04W 76/28* (2018.01)

(52) U.S. Cl.
CPC ......... *H04W 52/0212* (2013.01); *H04L 5/001* (2013.01); *H04L 5/0032* (2013.01);
(Continued)

(58) Field of Classification Search
CPC ............... H04W 76/048; H04W 76/28; H04W 52/0216; H04W 76/20; H04W 72/04;
(Continued)

(56) References Cited

U.S. PATENT DOCUMENTS 8,537,786 B2   9/2013   Tseng
8,744,496 B2   6/2014   Cave et al.
(Continued)

FOREIGN PATENT DOCUMENTS

WO   08/033463   3/2008
WO   10/013942   7/2009
(Continued)

OTHER PUBLICATIONS

Alcatel-Lucent et al., "Way forward for 3-4 Carriers HSDPA," RP-090982, 3GPP TSG-RAN#45, Seville, Spain, Sep. 15-18, 2009.
(Continued)

*Primary Examiner* — Oussama Roudani
(74) *Attorney, Agent, or Firm* — Volpe Koenig

(57) ABSTRACT

Method and apparatus for multi-carrier/multi-cell discontinuous reception (DRX)/discontinuous transmission (DTX) operations and activation/deactivation of DRX/DTX are disclosed. A wireless transmit/receive unit (WTRU) may configure at least one state variable for controlling DRX, DTX or both on a group of cells. The WTRU may receive an order for DRX or DTX activation or deactivation. The WTRU may determine a setting for the state variable based on the order. The WTRU may activate or deactivate DRX or DTX based on the setting for the state variable. The group of cells may include all cells within the same frequency band, all cells in a particular frequency or group of frequencies, and all secondary cells associated with a primary cell. The primary cell may be an uplink (UL) or downlink (DL) primary cell. The secondary cells may be UL or DL sec-
(Continued)

ondary cells. The WTRU may apply common, group-specific or cell-specific DRX monitoring.

26 Claims, 7 Drawing Sheets

Related U.S. Application Data

(60) Provisional application No. 61/355,889, filed on Jun. 17, 2010, provisional application No. 61/329,632, filed on Apr. 30, 2010, provisional application No. 61/320,648, filed on Apr. 2, 2010, provisional application No. 61/293,576, filed on Jan. 8, 2010.

(52) U.S. Cl.
CPC .......... *H04L 5/0096* (2013.01); *H04L 5/0098* (2013.01); *H04W 52/0229* (2013.01); *H04W 76/28* (2018.02); *H04L 5/0087* (2013.01); *Y02D 30/70* (2020.08)

(58) Field of Classification Search
CPC . H04W 76/34; H04W 72/10; H04W 72/0413; H04W 28/0278; H04W 72/0406; H04W 72/0453; H04W 72/042; H04L 5/0098; H04L 5/0053; H04L 5/0094; H04L 5/0044; H04L 5/0007; H04L 5/001
See application file for complete search history.

(56) References Cited

U.S. PATENT DOCUMENTS

| | | | | |
|---|---|---|---|---|
| 2009/0257387 A1* | 10/2009 | Gholmieh | ............. | H04W 28/16 370/329 |
| 2009/0296643 A1* | 12/2009 | Cave | ................. | H04W 52/0216 370/329 |
| 2009/0316575 A1* | 12/2009 | Gholmieh | ............. | H04W 76/20 370/225 |
| 2009/0316637 A1* | 12/2009 | Yi | ..................... | H04W 28/0278 370/329 |
| 2010/0118815 A1* | 5/2010 | Kim | .................. | H04W 52/0216 370/329 |
| 2010/0165835 A1* | 7/2010 | Hsu | ..................... | H04W 76/027 370/225 |
| 2010/0322175 A1* | 12/2010 | Chen | .................... | H04L 5/0007 370/329 |
| 2010/0323683 A1 | 12/2010 | Kazmi et al. | | |
| 2011/0002281 A1* | 1/2011 | Terry | ................ | H04W 52/0216 370/329 |
| 2011/0105069 A1* | 5/2011 | Gaal | ..................... | H04W 76/28 455/226.1 |
| 2011/0116467 A1 | 5/2011 | Jung et al. | | |
| 2011/0267957 A1* | 11/2011 | Du | .......................... | H04L 5/003 370/329 |
| 2011/0294491 A1* | 12/2011 | Fong | .................... | H04L 5/0098 455/422.1 |

FOREIGN PATENT DOCUMENTS

| | | |
|---|---|---|
| WO | 2009100136 A2 | 8/2009 |
| WO | 09/120124 | 10/2009 |
| WO | 10/147967 | 12/2010 |

OTHER PUBLICATIONS

CATT, "Clarification of DRX operation in CPC for LCR TDD," 3GPP TSG-RAN1 Meeting #56bis, R1-091602 (Mar. 23-27, 2009).
CMCC, "Multicarrier Operation and PDCCH design of Carrier Aggregation," 3GPP TSG RAN WG1 meeting #55, R1-084333 (Nov. 10-14, 2008).
Huawei, "Carrier aggregation in active mode," 3GPP Tsg-Ran WG2 Meeting #66, R2-093104 (May 4-8, 2009).
Huawei, "Drx Consideration in LTE-Advanced," 3GPP Tsg-Ran WG2 Meeting #67, R2-094735 (Aug. 24-28, 2009).
Interdigital Communications, Llc, "Considerations for 4-carrier Hsdpa Drx Design," 3GPP Tsg-Ran WG1 Meeting #60Bis, R1-102089 (Apr. 12-16, 2010).
Interdigital, "Dtx and carrier activation/deactivation for Dc-Hsupa," 3GPP Tsg-Ran WG2 Meeting #66, R2-093201 (May 4-8, 2009).
QUALCOMM Europe, "Activation/De-Activation of Secondary UL Carrier in DC-HSUPA," 3GPP TSG-RAN WG3 #64, R3-091222 (May 4-8, 2009).
QUALCOMM Europe, "HS-SCCH Orders for Secondary Carrier Activation/De-Activation in DC-HSUPA," 3GPP TSG-RAN WG1 #57, R1-091858 (May 4-8, 2009).
QUALCOMM Incorporated, "Activation/De-Activation of secondary carriers in 4C-HSDPA," 3GPP TSG RAN WG1 Meeting #59bis, R1-100282 (Oct. 18-22, 2009).
Samsung, "Discussion on activation/deactivation of dual-cell HSDPA," 3GPP TSG RAN WG1 Meeting #54, R1-083293 (Aug. 18-22, 2008).
Third Generation Partnership Project, "Technical Specification Group Radio Access Network; Medium Access Control (MAC) Protocol Specification (Release 9)," 3GPP TS 25.321 v9.1.0, Dec. 2009.
Third Generation Partnership Project, "Technical Specification Group Radio Access Network; Medium Access Control (MAC) Protocol Specification (Release 9)," 3GPP TS 25.321 v9.5.0, Dec. 2010.
Third Generation Partnership Project, "Technical Specification Group Radio Access Network; Medium Access Control (MAC) Protocol Specification (Release 10)," 3GPP TS 25.321 v10.1.0, Dec. 2010.
Third Generation Partnership Project, "Technical Specification Group Radio Access Network; Multiplexing and Channel Coding (FDD) (Release 9)," 3GPP TS 25.212 v9.1.0, Dec. 2009.
Third Generation Partnership Project, "Technical Specification Group Radio Access Network; Multiplexing and Channel Coding (FDD) (Release 9)," 3GPP TS 25.212 v9.4.0, Dec. 2010.
Third Generation Partnership Project, "Technical Specification Group Radio Access Network; Multiplexing and Channel Coding (FDD) (Release 10)," 3GPP TS 25.212 v10.1.0, Dec. 2010.
Third Generation Partnership Project, "Technical Specification Group Radio Access Network; Physical Layer Procedures (FDD) (Release 9)," 3GPP TS 25.214 v9.1.0, Dec. 2009.
Third Generation Partnership Project, "Technical Specification Group Radio Access Network; Physical Layer Procedures (FDD) (Release 9)," 3GPP TS 25.214 v9.4.0, Dec. 2010.
Third Generation Partnership Project, "Technical Specification Group Radio Access Network; Physical Layer Procedures (FDD) (Release 10)," 3GPP TS 25.214 v10.1.0, Dec. 2010.
ZTE, "Carrier activation for 4C-HSDPA," 3GPP TSG RAN WG1 #59, R1-094760 (Nov. 9-13, 2009).
Alcatel-Lucent et al., "Initial Analysis for 4 carrier-HSDPA," 3GPP TSG-RAN WG1 #58bis, R1-093760, Miyazaki, Japan (Oct. 12-16, 2009).
Third Generation Partnership Project, "Technical Specification Group Radio Access Network; Physical layer procedures (FDD) (Release 7)," 3GPP TS 25.214 V7.17.0 (Dec. 2010).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.6.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.12.0 (Dec. 2010).

Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.1.0 (Dec. 2009).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.5.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.0.0 (Dec. 2010).

\* cited by examiner

METHOD AND APPARATUS FOR PERFORMING DISCONTINUOUS RECEPTION AND/OR DISCONTINUOUS TRANSMISSION FOR A MULTI-CARRIER/MULTI-CELL OPERATION

CROSS REFERENCE TO RELATED APPLICATIONS

This application is a continuation of U.S. patent application Ser. No. 12/987,013 filed Jan. 7, 2011, which claims the benefit of U.S. Provisional Application Nos. 61/293,576 filed Jan. 8, 2010, 61/320,648 filed Apr. 2, 2010, 61/329,632 filed Apr. 30, 2010, and 61/355,889 filed Jun. 17, 2010, the contents of which are incorporated by reference herein.

BACKGROUND

New communications devices with advanced data capabilities have been brought to the market that allow the devices to connect to the broadband services, such as Internet, wirelessly. These new devices create an increasing demand for higher data rate and bandwidth to wireless service providers and operators. In order to meet these demands, dual carrier high speed downlink packet access (DC-HSDPA) was introduced in Release 8 of third generation partnership project (3GPP) to increase the throughput and provide efficient load balancing across carriers. Dual carrier high speed uplink packet access (DC-HSUPA) was also introduced in Release 9 of 3GPP to increase the uplink (UL) average and cell edge user throughputs. Both DC-HSDPA and DC-HSUPA offer a capacity gain from system performance perspective through aggregating multiple carriers on the downlink (DL) and the UL, respectively.

Continuous Packet Connectivity (CPC) was introduced for increasing the number of packet data users, (i.e., high speed packet access (HSPA) users), in the universal mobile telecommunication systems (UMTS), where the users stay connected over a long period of time with occasional active periods of data transmission, and avoiding frequent connection termination and re-establishment. Completely releasing dedicated channels during periods of traffic inactivity would cause considerable delays for reestablishing the data transmission. However, maintaining the control channels will significantly limit the number of users that can be efficiently supported due to a noise rise on the UL. CPC is intended to reduce the impact of control channels on UL noise rise while maintaining the connections and allowing a much faster reactivation for temporarily inactive users.

As the key features of CPC, discontinuous reception/discontinuous transmission (DRX/DTX) in a Cell_DCH state was introduced in Release 7 to save UL capacity and extend user equipment (UE) battery life during inactivity periods while providing users an "always-on" experience. In Release 8 and Release 9, a single DRX state machine is maintained across the DL carriers for simplicity, and two independent DTX state machines are maintained in the UL for a better UE DTX gain.

With the rapid increase of data usage, HSPA is expected to be deployed on more than two carriers. Multi-carrier operations allow a UE and a network to receive and transmit on two or more carriers, thus increase the capacity of the system. Release 10 of the 3GPP supports up to four HSDPA carriers spread over one or two frequency bands and up to two adjacent HSUPA carriers. Recently, eight carrier HSDPA (8C-HSDPA) is proposed for Release 11 of 3GPP to further exploit the available spectrum to achieve substantial gains in terms of both cell and user throughput.

SUMMARY

Embodiments for multi-carrier/multi-cell DRX/DTX operations, autonomous deactivation of the secondary carrier(s)/cell(s), and explicit activation/deactivation of DRX/DTX and secondary carriers/cells are disclosed.

In accordance with one embodiment, a UE may configure at least one state variable for controlling DRX and/or DTX on a plurality of cells and perform an DRX and/or DTX operation on a subset of cells based on a state variable associated with the subset of cells on a cell group basis. The UE may activate or deactivate DRX and/or DTX based on an order from a network for all cells, a group of cells, or an individual cell. The UE may deactivate the secondary cell or all secondary cells in a group autonomously based on an inactivity timer.

In accordance with another embodiment, the UE may receive a high speed shared control channel (HS-SCCH) order for activating and/or deactivating secondary cells, and activate and/or deactivate the secondary cells in accordance with the HS-SCCH order, wherein the HS-SCCH order may be applied to a subset of secondary cells that are predetermined as allowed to be activated and/or deactivated by the HS-SCCH order.

Alternatively, a first subset of secondary cells may be activated and/or deactivated individually and a second subset of secondary cells may be activated and/or deactivated as a group. In this case, additionally, the UE may receive a second HS-SCCH order for the second subset of secondary cells, and activate and/or deactivate the second subset of secondary cells either individually or as a subgroup of cells based on the second HS-SCCH order.

Alternatively, the UE may receive a plurality of HS-SCCH orders simultaneously for activating and/or deactivating secondary cells, and activate and/or deactivate the secondary cells individually in accordance with the HS-SCCH orders. Each HS-SCCH order may be for activating and/or deactivating a different subset of secondary cells and the HS-SCCH orders may use non-overlapping combinations of order type bits and order bits.

In accordance with another embodiment, the UE may monitor activity on the secondary cell or a group of cells including the secondary cell using an inactivity timer, and deactivate the secondary cell autonomously on a condition that the inactivity timer expires. The UE may deactivate the secondary cell autonomously on a condition that the inactivity timer expires after entering DRX on the secondary cell.

BRIEF DESCRIPTION OF THE DRAWINGS

A more detailed understanding may be had from the following description, given by way of example in conjunction with the accompanying drawings wherein.

DETAILED DESCRIPTION

Figure 1A:
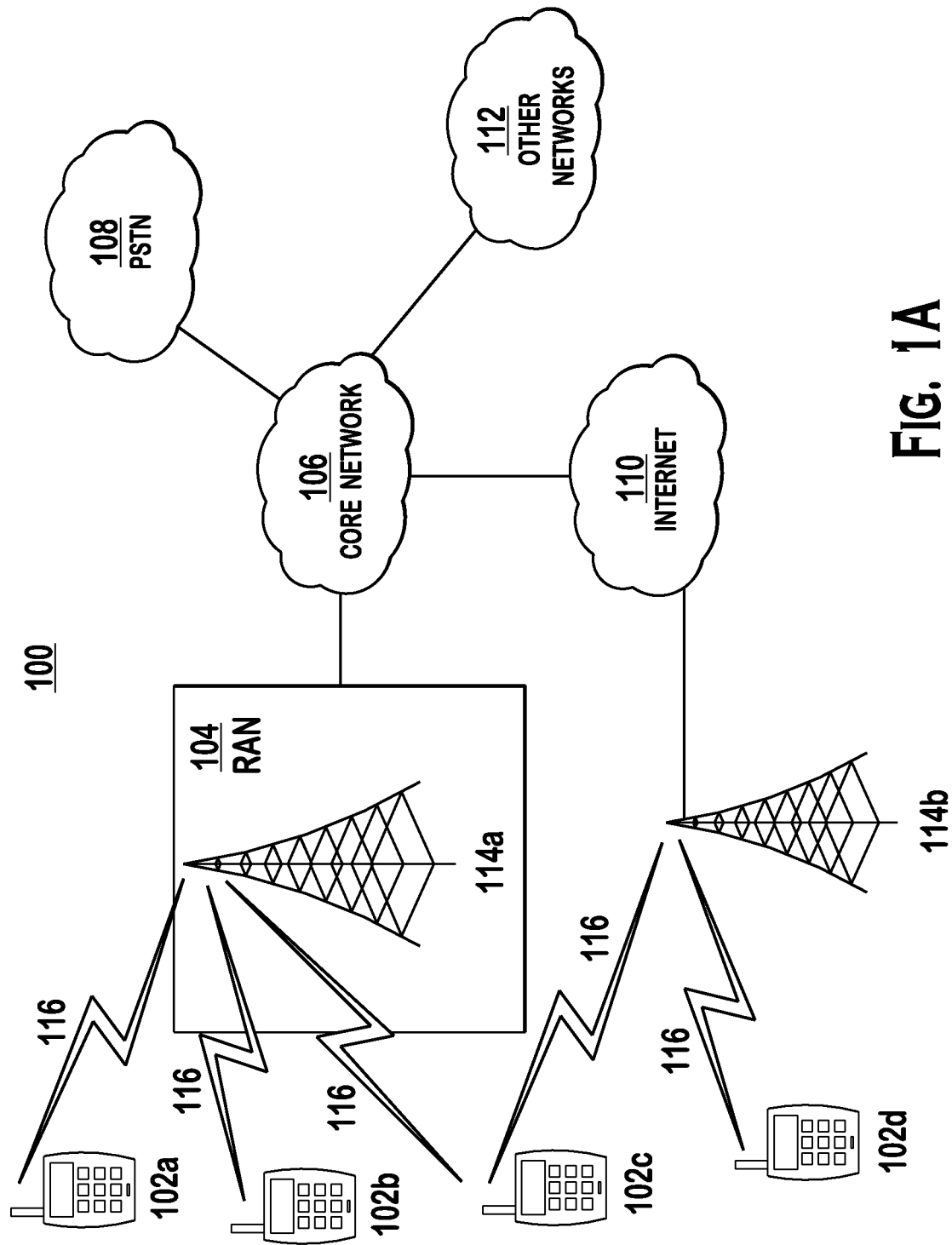
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The embodiments disclosed below will use the terminology "UE", which may be any type of wireless transmit/receive devices, such as the ones listed above.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode-B, a Home Node-B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
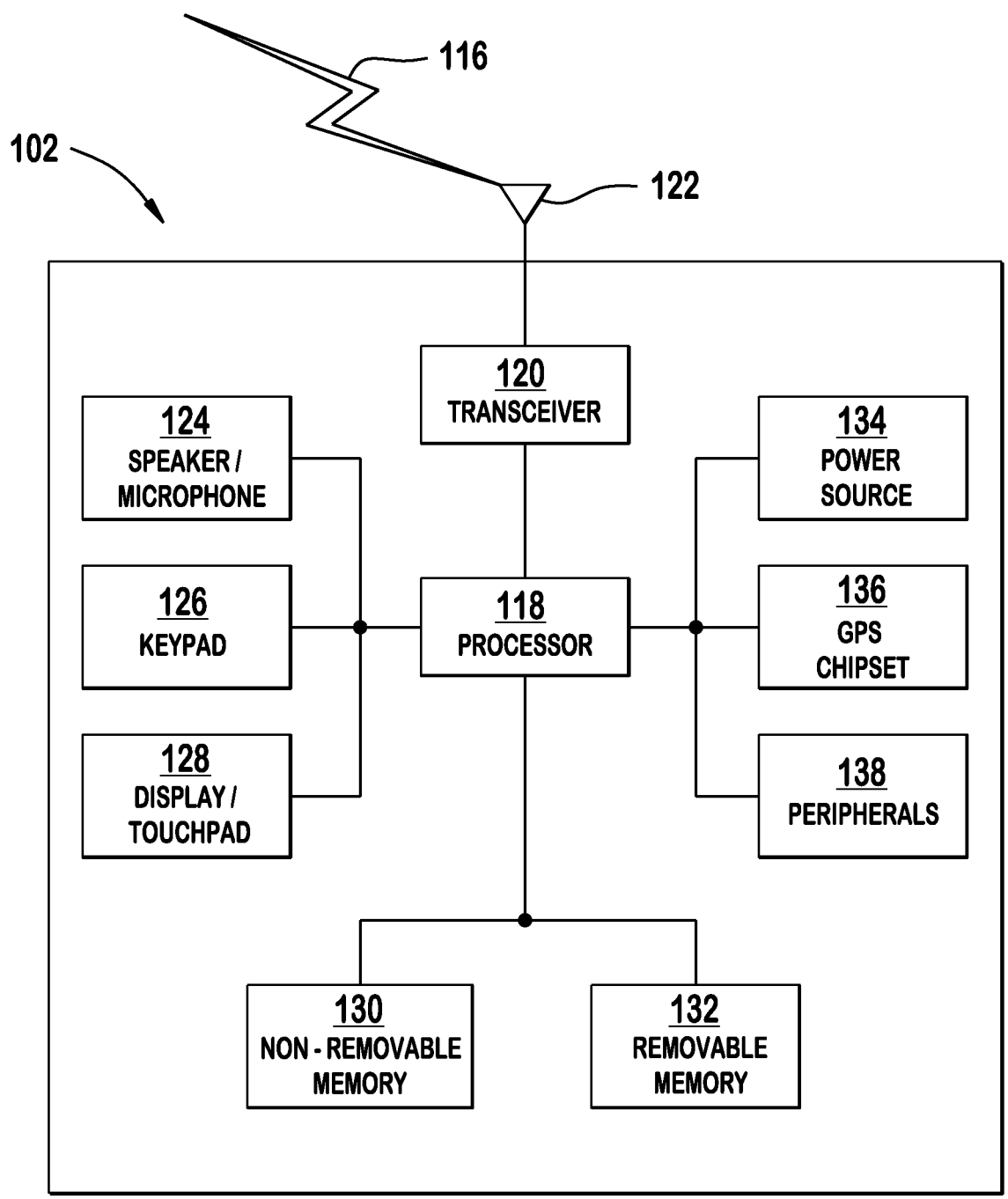
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, ITV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
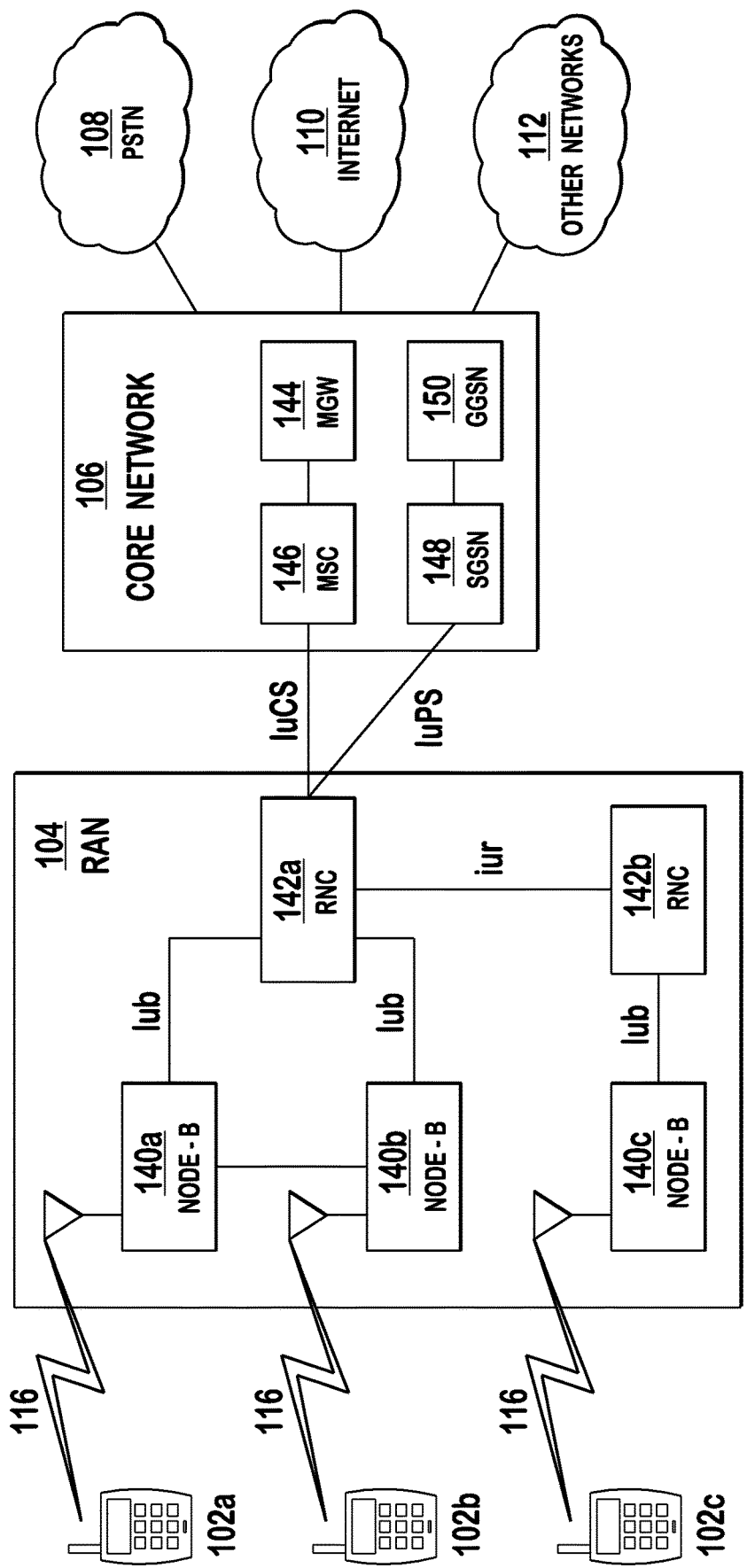
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired or wireless networks that are owned and/or operated by other service providers.

Embodiments for multi-carrier/multi-cell DRX/DTX operations, autonomous deactivation of the secondary carrier(s)/cell(s), and explicit activation/deactivation of DRX/DTX and secondary carriers/cells are disclosed. It should be noted that the embodiments will be described in the context of MC-HSPA systems, but they are applicable to any wireless systems, such as long term evolution (LTE), cdma2000, IEEE 802.xx, and any other wireless communication systems with multi-carriers/multi-cells and DRX/DTX operations. It should be noted that multi-carriers may be operated on the same or different sectors or cells of the same Node-B or different Node-Bs, and multi-carriers may refer to multi-cells which may be carried over a single or multiple radio frequencies operated on overlapping or non-overlapping cells or sectors of the Node-Bs.

Hereinafter, the terminologies "multi-carriers" and "multi-cells," and "secondary carriers" and "secondary cells" may be used interchangeably, respectively. It should be noted that the embodiments disclosed below may be applied to either the multi-carrier operations or multi-cell operations, and even though some embodiments are disclosed with reference to multi-carrier operations, they are applicable for the multi-cell operations, and vice versa. The multi-cell operations may be implemented on the same frequency (i.e., carrier) or different frequencies.

A "primary band" is a band which includes a primary carrier or cell and may include zero, one or more than one secondary carrier and/or secondary cell. A "secondary band" is a band which does not include a primary carrier but one or more secondary carriers and cells. MC-HSDPA may be configured with M DL carriers or cells. MC-HSUPA may be configured with M or more DL carriers or cells.

A "primary UL carrier" or "primary UL cell" may be defined, in case more than one UL carrier or cell is configured for the UE, as the carrier or the UL serving cell on which the enhanced dedicated channel (E-DCH) corresponding to the serving E-DCH cell associated with the serving high speed downlink shared channel (HS-DSCH) cell is transmitted. A "secondary UL carrier" or "secondary UL cell" may refer to a carrier a DL serving cell on which an E-DCH corresponding to a serving E-DCH cell associated with a secondary serving HS-DSCH cell is transmitted. Alternatively, a primary UL cell may refer to a cell in which the UL feedback is transmitted, and any cell that is not assigned as a primary UL cell may be defined as a secondary UL cell.

A "primary DL cell" may refer to a DL serving cell that is associated with a particular UL cell or frequency. In case of multi-cell uplink, this UL cell is the primary UL cell, (i.e., frequency). The "primary DL cell" may refer to the serving DL cell that may not be deactivated. The primary DL cell, in one example for HSPA, may be used to carry a particular DL channel(s), for example at least one of a fractional dedicated physical channel (F-DPCH), an enhanced-absolute grant channel (E-AGCH), a physical downlink control channel (PDCCH), or other channels. Other physical channels such as a common pilot channel (CPICH), a high-speed shared control channel (HS-SCCH) and a high-speed physical downlink shared channel (HS-PDSCH) may be read from any DL cells, such as the secondary DL cell. When more than one DL carrier carries DL control channels associated with one or more UL carriers, the "primary DL carrier/cell" may refer to a DL carrier/cell configured with a "primary" carrier/cell attribute. If a single DL carrier is configured for the UE, then it may be the primary DL carrier.

A "secondary DL cell" may refer to one of a set of cells where the UE is configured to simultaneously monitor an HS-SCCH set and receive an HS-DSCH if it is scheduled in that cell in addition to the serving HS-DSCH cell. If the number of DL cells is greater than the number of UL cells, the index of a secondary serving HS-DSCH cell may be indicated by a higher layer. If the UE is configured with two UL cells, the first secondary serving DL cell may be the secondary serving DL cell that is associated with the secondary UL frequency and the rest of secondary serving DL cells may be indicated by a higher layer.

For a specific UE, a UL carrier is said to be activated if the UE is allowed to transmit on that frequency. The primary UL frequency is activated when configured while a secondary UL carrier may be activated by means of an HS-SCCH order. For a specific UE, a UL carrier is said to be deactivated if it is configured but disallowed to transmit on that carrier by the Node B or in accordance with any embodiments disclosed herein. For a specific UE, a UL carrier is said to be configured if the UE has received all relevant information from higher layers to perform transmission on that carrier. The terminologies "carrier" and "frequency" will be used interchangeably. Additionally, when referred to hereafter a primary or secondary UL carrier may correspond to a primary or secondary UL cell and the terms may be used interchangeably. More specifically, the activation/deactivation of a secondary carrier may correspond to the activation/deactivation of a secondary cell.

Embodiments for DRX/DTX operations are described.

In MC-HSPA systems, multiple carriers or multiple cells may be configured in one or more frequency bands. In accordance with one embodiment, all DL carriers or DL cells may follow the same DRX control. For example, a single DL_DRX_Active state variable may be maintained for all DL carriers/cells and DRX operations on all DL carriers or cells may be controlled by the single DL_DRX_Active state variable, (i.e., a UE may be on or idle state on all DL carriers or cells simultaneously according to the predetermined criteria).

In accordance with another embodiment, the DRX control may be applied on a per-carrier or cell basis.

In accordance with another embodiment, DL cells are grouped into a plurality of groups and a DRX control may be applied per cell group. A cell group may be explicitly or implicitly signaled, for example, by an RRC message. The cells may be grouped in accordance with any one of the embodiments disclosed below. It is understood that the grouping below may also be applicable to other embodiments such as, but not limited to, embodiment for DTX and activation/deactivation of cells.

A cell group may include cells in two or more adjacent carriers.

Alternatively, a cell group may include all secondary DL cells or all DL cells in a given frequency band. The frequency band may be explicitly configured, (e.g., through RRC signaling). Alternatively, the UE may implicitly determine the frequency band based on the UTRA absolute radio frequency channel number (UARFCN) value provided by the network.

Alternatively, a cell group may include all secondary DL cells or all DL cells in a given frequency. This may be the case where multiple cells are configured in the same frequency or a number of frequencies.

Alternatively, a cell group may include all secondary DL cells. Alternatively, a cell group may include all secondary DL cells associated with a given primary DL cell (whether in the same frequency band or not). The association of secondary cells with a primary cell, may be an explicit association that is performed by higher layers. Alternatively, a cell group may include all secondary DL cells associated with a given primary UL cell or a given UL cell. This association may refer to a group of cells which have been configured to receive feedback from the same UL cell or channel. For example, in an embodiment where several UL feedback channels or resources are deployed for multiple downlinks, the network may configure the UE to provide feedback on one particular UL for a set of DL cells. This set of DL cells may belong to a cell group. Alternatively, a cell group may include all the cells that are included in a pre-defined list of DL cell (e.g., explicit definitions of groups). Alternatively, a cell group may include all DL cells in a particular frequency band. Alternatively, a cell group may include all cells in DL adjacent carriers. Alternatively, a cell group may include all cells in a particular frequency or in a particular group of frequencies. Alternatively, a cell group may include all DL cells in adjacent carriers associated with a given primary UL carrier or a given UL carrier. Even though the grouping above is described in the context of DL cells it is equally applicable to UL cells.

The cells may be grouped based on activation status of the configured cells. For example, in a four-cell system, (e.g., 4C-HSDPA), if four cells are activated, the first two activated cells may be grouped together, and the other two activated cells may be grouped together. If three cells are activated, the first and second cells may be grouped together, and the third cell may belong to the other group. If two cells are activated, they may be grouped together.

The grouping may be kept the same regardless of the subsequent activation status change of the cells. Alternatively, the grouping may be changed based on the activation status of the cells. All activated carriers may be re-grouped by any or a combination of the embodiments described above. All activated cells may keep the same grouping as before activation or deactivation without including the deactivated cells. All deactivated cells may be grouped together, (e.g., all deactivated cells may belong to one group). All deactivated cells may be re-grouped by any or a combination of the embodiments described above. All deactivated cells may keep the same grouping as before activation/deactivation without including the activated cells.

Alternatively, a cell group may include a subset of secondary cells (serving HS-DSCH cells) for MC-HSDPA operations, where the subset is predefined or determined based on a predefined rule, configured or signaled. For example, in 8C-HSDPA operation with eight DL cells, the fifth to eighth DL cells may be grouped together, while the first to fourth DL cells may or may not be grouped together. The secondary serving cells may be numbered in the order their configuration information elements (IEs) appear in the RRC message, or numbered explicitly by the RRC. The numbering of the secondary serving cells may be signaled to the lower layer(s) from a higher layer, (e.g., RRC), or pre-defined.

Alternatively, the cell group may include sets of N DL cells or alternatively N carriers (wherein all the cells in those carriers belong to the same group), where N may be any pre-defined or signaled value less than M. The cells in each group may be chosen in order by which they appear in the RRC configuration message. N may be a factor of M. The secondary serving cells may be numbered in the order their configuration IEs appear in the RRC message or pre-defined. For example, for 8C-HSDPA operation, M=8 and N=4 result in two groups. One group may comprise the HS-DSCH serving cell and the first three secondary serving HS-DSCH cells, and the other group may include the remaining secondary serving HS-DSCH cells.

The UL cells may also be grouped in accordance with any embodiment disclosed above, and the activation and deactivation of DL and/or UL carriers (or cells) may be performed per group.

Assuming there are K group of cells (G1, G2, . . . , GK), DRX (and/or DTX) control for MC-HSPA may be applied per group of cells. In accordance with one embodiment, the DL_DRX_Active state variable may be maintained and evaluated individually per group of cells and the UE may independently control the DRX operations of each group of cells according to the corresponding DL_DRX_Active state variable for each group. The control of the DRX operation may be performed as follows.

K DL_DRX_Active state variables may be independently maintained and evaluated for K groups. DL_DRX_Active of the $k^{th}$ group of cells (denoted as DL_DRX_Active(k)) is set to TRUE while UE_DTX_DRX_Enabled(k) is TRUE and UL_DTX_Active(k) is TRUE and discontinuous DL reception of the $k^{th}$ group of cells is activated. Otherwise, DL_DRX_Active(k) is set to FALSE. UE_DTX_DRX_Enable(k) is set to TRUE after the higher layer sets DTX_DRX_STATUS(k) to TRUE and Enabling_Delay(k) radio frames have passed. Otherwise, UE_DTX_DRX_Enabled(k) is set to FALSE. Discontinuous DL reception of the $k^{th}$ group of cells may be activated at the time when UE_DTX_DRX_Enabled(k) is set to TRUE, and may be further deactivated or activated by layer 1 high speed shared control channel (HS-SCCH) order targeting the $k^{th}$ group of cells. Here k is the index of the group, k=1, 2, . . . , K, and K is the total number of groups.

Based on the evaluated DL_DRX_Active state variable for each group, the UE may independently take the following actions for each group of cells. For the group k, on a condition that DL_DRX_Activate(k) is FALSE, the UE may continuously monitor and receive all DL physical channels over the $k^{th}$ group of cells. If DL_DRX_Active(k) is TRUE, the UE may continue to receive an F-DPCH and may not receive physical DL channels other than the F-DPCH on the $k^{th}$ group of cells except the following seven exceptions:

(1) Depending on the number of UL cells associated with any of the DL cells in the $k^{th}$ group, the UE may respectively receive E-DCH HARQ indicator channel (E-HICH) subframes corresponding to its own E-DCH transmission on the UL cells associated with one of the DL carriers in the $k^{th}$ group.

(2) The UE may monitor the HS-SCCH subframes in terms of the HS-SCCH reception pattern of the $k^{th}$ group. For different group of cells, the HS-SCCH reception pattern may or may not be the same depending on the DRX parameter configuration. For example, UE_DTX_DRX_Offset(k) and/or UE_DRX_cycle(k) may be independently be configured on a per-cell group basis, which may result in a different HS-SCCH reception pattern for a different group of cells. The DRX parameters UE_DTX_DRX_Offset(k) and UE_DRX_cycle(k) may be common for all DL carriers.

(3) The UE may receive a high speed physical DL shared channel (HS-PDSCH) subframes either following an HS-SCCH or as required to for HS-SCCH-less reception on the DL cells of the $k^{th}$ group.

(4) The UE has received an HS-SCCH or an HS-PDSCH subframe during the last Inactivity_Threshold_for_UE_DRX_cycle(k) subframes which was not an HS-SCCH order. Inactivity_Threshold_for_UE_DRX_cycle(k) for the $k^{th}$ group may be independently configured on a per-group basis. Inactivity_Threshold_for_UE_DRX_cycle(k) may be common for all DL cells.

(5) The UE may receive an E-DCH absolute grant channel (E-AGCH) transmission from the serving E-DCH cell when preconfigured conditions are fulfilled or if UE_DRX_Grant Monitoring(k) is TRUE and the E-AGCH overlaps with the start of an HS-SCCH reception subframe based on the HS-SCCH reception pattern in the $k^{th}$ group. UE_DRX_Grant Monitoring(k) may be independently configured on a per-carrier group basis. UE_DRX_Grant Monitoring(k) may be common for all DL cells.

(6) The UE may receive an E-DCH relative grant channel (E-RGCH) transmission from a cell in the serving E-DCH radio link set when preconfigured conditions are fulfilled, or if UE_DRX_Grant Monitoring(k) is TRUE and the corresponding serving cell E-RGCH overlaps with the start of an HS-SCCH reception subframe based on the HS-SCCH reception pattern in the $k^{th}$ group.

(7) The UE may receive the E-RGCH(s) from all the other cells in the E-DCH active set, except from the cells in the serving E-DCH radio link set, when preconfigured conditions are fulfilled in the $k^{th}$ group.

The above exceptions (1), (5), (6) and (7) may not be applied for the $k^{th}$ group if there is no UL carrier associated with any of the DL carriers in the $k^{th}$ group.

In accordance with another embodiment, a single DL_DRX_Active state variable is maintained for all DL carriers, (i.e., the DRX status is common for all DL carriers), and the DRX operation is controlled per-carrier group as follows.

A single DL_DRX_Active state variable may be maintained and evaluated for all DL carriers. DL_DRX_Active is set to TRUE while UE_DTX_DRX_Enabled is TRUE and UL_DTX_Active is TRUE and discontinuous DL reception is activated. Otherwise, DL_DRX_Active is set to FALSE. UE_DTX_DRX_Enabled is set to TRUE after the higher layers have set DTX_DRX_STATUS to TRUE and Enabling_Delay radio frames have passed. Otherwise, UE_DTX_DRX_Enabled is set to FALSE. Discontinuous DL reception is activated at the time when UE_DTX_DRX_Enabled is set to TRUE, and may be further deactivated or activated by the layer 1 HS-SCCH orders. DTX_DRX_STATUS and Enabling_Delay may be common for all DL carriers.

Based on the evaluated DL_DRX_Active state variable, (all group of carriers have the same DL_DRX_Active), the UE may independently take the following actions for each group of carriers. If DL_DRX_Active is FALSE, the UE may continuously monitor and receive all DL physical channels for all groups of carriers. If DL_DRX_Active is TRUE, the UE may continue to receive an F-DPCH and may not receive physical DL channels other than the F-DPCH except for the seven exceptions described above. The UE may apply the exceptions (1) through (7) individually to each carrier group to determine whether it needs to receive on the corresponding DL channels or not for the particular group, (i.e., the UE monitors and receives the corresponding DL channel in accordance with the exceptions per-carrier group).

The difference between the first and second embodiments is that, in the first embodiment, the UE applies the exceptions (1) through (7) to the groups that have the DL_DRX_Active(k) state variable set to TRUE, but in the second embodiment, the UE applies the exceptions (1) to rule (7) (if they are applicable) to all groups if the single DL_DRX_Active is true, but the exceptions are applied on a per-group basis.

Embodiments for autonomous deactivation of the secondary cell(s) are disclosed.

In accordance with one embodiment, a UE may deactivate a secondary cell when a deactivation inactivity timer expires in the UE, (e.g., no data is received on that secondary DL cell or on any DL cell (i.e., primary and secondary DL cell)). The value for the deactivation inactivity timer may be same to the value that the UE may enter DRX after expiration, (i.e., Inactivity_Threshold_for_UE_DRX_cycle). Alternatively, the deactivation inactivity timer value may be a different value, (e.g., deactivation_inactivity_threshold).

In accordance with another embodiment, the UE may deactivate the secondary cell in two steps. In the first step, the UE may enter DRX if the UE does not receive any data, (e.g., reception of an HS-SCCH or an HS-PDSCH subframe in WCDMA or no new UL/DL reception on a physical downlink control channel (PDCCH) in LTE during the last Inactivity_Threshold_for_UE_DRX_cycle subframes, excluding HS-SCCH orders, or the UE may enter DRX upon initial configuration or upon an explicit HS-SCCH order.

In the second step, the UE may deactivate the secondary cell on a condition that an additional deactivation inactivity timer expires from the initiation of the DRX. For example, the UE may deactivate the secondary cell (s) on a condition that the UE has not received any transmission, (e.g., an HS-SCCH or HS-PDSCH subframe or UL/DL receptions on a PDCCH) during the last deactivation_inactivity_threshold subframes since entering DRX (including all HS-SCCH and HS-PDSCH receptions and HS-SCCH orders for carrier activation, or alternatively not including HS-SCCH orders). Alternatively, the UE may deactivate the secondary cell(s) on a condition that no HS-SCCH or HS-PDSCH subframes were received during the last (Inactivity_Threshold_for_UE_DRX_cycle+deactivation_inactivity_threshold) subframes. The autonomous deactivation may be linked to DRX, which will be explained in detail below. The HS-SCCH or HS-PDSCH subframe reception throughout the disclosures may correspond to no PDCCH reception or no UL or no DL transmissions scheduled on the PDCCH in LTE.

The UE may deactivate the secondary cell (s) upon reception of a DRX activation order for the secondary cell, for a group of cells including the secondary cell, or for all cell. More specifically, once the UE receives an HS-SCCH order for activating the DRX, the UE may deactivate the secondary cell. DRX deactivation may reactivate the secondary cell if it is in a deactivated state.

The UE may deactivate the secondary cell upon initial configuration of DRX, wherein the UE considers initial state of DRX active. For example, when DRX is configured in the UE for a secondary cell, that secondary cell may be deactivated. This may include the condition that an HS-DSCH serving cell change occurs, where the UE sets the DRX status as if no HS-SCCH orders were received (i.e., active).

The deactivation status may depend on the DRX status. When DL_DRX_Active is TRUE so that the UE may start DRX, (such as when a DRX activation order is received, DRX is configured for the first time from higher layers including when an HS-DSCH serving cell change occurs, a DTX activation order to the associated UL carrier is received, or when the UE starts DRX after Inactivity_Threshold_for_UE_DRX_cycle subframes), the UE may deactivate the secondary cell(s).

The secondary cell may be initially considered to be activated when an HS-SCCH DRX activation order is received, when an initial DRX operation starts, and/or when an HS-DSCH serving cell change occurs, and may be autonomously deactivated later according to one of the embodiments disclosed above. For example, if the initial state of the secondary cell is active, the UE may deactivate the secondary cell once the DRX status of the UE changes from the continuous reception, (e.g., the UE monitors an HS-SCCH(s) continuously for at least Inactivity_Threshold_for_UE_DRX_cycle subframes), to the discontinuous reception, (e.g., the UE does not monitor an HS-SCCH(s) continuously).

Alternatively, the secondary carrier may be considered to be active and in DRX, and may be deactivated once the UE determines that no data is received for a certain period of time, (e.g., Inactivity_Threshold_for_UE_DRX_cycle or deactivation_inactivity_threshold).

Alternatively, the autonomous deactivation may or may not be linked to DRX, and a timer (or a counter) may be started or re-started when the secondary DL carrier is configured, when the secondary DL cell is activated using an activation order, when the UE receives an activation order, when the UE receives data, (e.g., HS-SCCH or HS-PDSCH), when the DL cells are configured or activated in more than one frequency band, when the UE received power measurement, (such as common pilot channel (CPICH) received signal code power (RSCP), received signal strength indicator (RSSI), etc.), or the received transport block size or the measured channel quality indicator (CQI) value on the primary DL cell is lower than a pre-defined or configured threshold, and/or when the primary DL cell is configured with an HS-SCCH-less operation, or the like. When the timer expires, the UE may deactivate the secondary cell.

Embodiments for re-activation of the deactivated secondary cell (s) are disclosed. The deactivated secondary cell may be re-activated on a condition that data is received on the primary cell, on any active cell in the primary band, or on any active cell. The data reception on the primary cell, on any active cell in the primary band, or any active cell may include reception of an HS-SCCH or HS-PDSCH subframe, including reception of an HS-SCCH or HS-PDSCH subframe while the UE performs continuous reception for a pre-defined period, (e.g., Inactivity_Threshold_for_UE_DRX_cycle or deactivation_inactivity_threshold), reception of an HS-SCCH that is not an HS-SCCH order, and/or reception of a special or reserved absolute grant value on an E-AGCH.

Alternatively, the deactivated cell may be re-activated upon reception of an activation order, (i.e., the network sends an explicit order).

The reactivation of the cell (s) may be dependent on receiving data on at least one cell for a pre-defined period of time. For instance, if a cell (e.g., a primary cell or any activated cell) stays on continuous reception for a predetermined number of subframes, the UE may reactivate the secondary cell (s). Alternatively, the reactivation may depend on the amount of data being received by the UE. If the UE receives a certain amount of data, (e.g., receiving more than pre-determined number of bytes or bits, or receiving a number of transport blocks (TBs) more than a threshold considering with a TB size), optionally during a pre-defined period of time, the UE may reactivate the secondary cell (s) autonomously. Alternatively, the secondary cell may be re-activated on a condition that the UE receives data from a high priority logical channel. Alternatively, the reactivation may occur upon reception of a DRX deactivation order or a DRX configuration removal from the network.

Alternatively, the secondary cell (s) may be re-activated on a condition that the UE power measurement, (such as CPICH RSCP, RSSI, etc.), the received transport block size, or the measured CQI value on the primary DL cell is equal to or higher than a pre-defined or configured threshold. Alternatively, the secondary cell may be reactivated upon reception of an HS-SCCH-less deactivation order or an HS-SCCH-less configuration removal from the network.

When two or more secondary cells are activated or configured, and one or a combination of the criteria for cell deactivation described above is met, the UE may deactivate all or a sub-set of secondary cells. Alternatively, the deactivation criteria may be monitored per secondary cell and the UE may deactivate at least the secondary cell on which the deactivation criteria are met. Alternatively, the deactivation criteria may be monitored per group of secondary cells, where the group of secondary carriers may be predefined, (e.g., cells that belong to the same band, frequency, or according to any of the conditions described above) or may be explicitly configured by the RRC signaling or according to a predefined rule. For example, if X cells are considered a set or group of cells, the inactivity period may be monitored over all X cells. The above may be applied to the activation of the cells.

The deactivation inactivity timer associated with the autonomous deactivation of the secondary cell(s) may be configured in one or a combination of the following ways. One common inactivity threshold (or inactivity timer) may be configured for all secondary cells. Alternatively, an inactivity threshold (or inactivity timer) may be configured per cell or per group of cells. The cells may be grouped in accordance with any embodiments disclosed above. For example, for dual band case, a per-band inactivity timer may be configured for the primary band and the secondary band, respectively. For example, the inactivity timer for the primary band may be set to a larger value (such as "infinity"), while the inactivity timer for the secondary band may be set to a smaller value to facilitate power saving by shutting down the secondary band receiver with a lower threshold.

The autonomous activation/deactivation of a secondary cell (s) may or may not be allowed in all UEs supporting multi-carrier operation, or it may be explicitly configured by the network. The autonomous activation/deactivation of a secondary cell(s) may be linked to the inactivity time threshold value, such that if the inactivity time threshold value is below a certain value (e.g., zero), the UE may autonomously deactivate the cell.

Embodiments for the autonomous deactivation mode configuration (disable and enable with different starting time) are disclosed hereafter.

In accordance with one embodiment, the network may configure the inactivity timer and the autonomous deactivation mode in the UE to be determined based on the inactivity timer value. The UE may determine whether it needs to perform the autonomous deactivation based on the inactivity timer configuration. The inactivity timer value may be set to infinity or to a predefined value in a finite set of values in the configuration message. For example, the autonomous deactivation mode may be disabled in the UE by configuring the inactivity timer to "infinity." The network may configure the autonomous deactivation to start right after Inactivity_Threshold_for_UE_DRX_cycle by configuring the inactivity timer to "0." Alternatively, the network may enable the autonomous deactivation to start after an inactivity of a predetermined number of subframes, (e.g., deactivation_inactivity_threshold), in the UE by configuring the inactivity timer to a certain value instead of "infinity" or "0." Alternatively, the inactivity timer may be an enumerated IE, and one of the enumerated values may be reserved to signal that no deactivation mechanism may be applied for the given cell. Alternatively, the absence of the inactivity timer IE in the configuration message may be interpreted that the UE may not autonomously deactivate the secondary cell.

In accordance with another embodiment, the network may configure the autonomous deactivation mode by introducing a semi-static parameter signaled via high layers. The inactivity timer may be pre-defined in the specification or signaled as described above. A new IE may be introduced in the RRC message. The UE extracts the autonomous deactivation mode configuration information from the RRC message. For example, a new parameter called "Status of AUTONOMOUS-DEACTIVATION configuration" may be defined, which is signaled to the physical layer in the UE and the Node-B from a higher layer. "Status of AUTONOMOUS-DEACTIVATION configuration" may be a binary value 0 or 1, indicating disable or enable of the autonomous deactivation mode.

In accordance with another embodiment, the autonomous deactivation mode may be dynamically activated and deactivated by the HS-SCCH order. The HS-SCCH order includes order type bits and order bits. For example, under the current 3GPP specification, the order bits "100" and "101" are reserved when the order type is "000." These reserved order bits may be used for this purpose, as shown in Table 1. A different mapping other than Table 1 may be used. Alternatively, a new order type may be introduced for this purpose.

TABLE 1

| Order type | $x_{ord,1} = x_{drx,1}$ | $x_{ord,2} = x_{dtx,1}$ | $x_{ord,3} = x_{hs\text{-}scch\text{-}less,1}$ | Order |
|---|---|---|---|---|
| 000 | 1 | 0 | 0 | Deactivate autonomous deactivation |
| | 1 | 0 | 1 | Activate autonomous deactivation |

If a secondary UL cell is configured or active, the status of the secondary UL cell may be dependent on the status of the associated DL cell. The secondary DL cell associated with the secondary UL cell may not be deactivated even if the deactivation criteria for the secondary DL cell specified above are met, (i.e., a secondary DL cell may be deactivated if the deactivation criteria above are met and the secondary DL cell has no associated secondary UL cell). Alternatively, the deactivation of the secondary cell may depend on whether the associated secondary UL cell is activated. If the criteria to deactivate a group of DL cells is met, and a secondary DL cell within the group is associated with a UL cell, the UE may deactivate all other secondary DL cells in the group and follow the rules described herein to determine the activation status of the associated secondary UL cell (or UL cells if more than one secondary UL cell is present). For example, according to the rule above if the UL cell is active the UE may deactivate all DL cells in the group except the secondary DL cell associated with the UL cell. Alternatively, even though the deactivation criteria are met, the UE may not deactivate any of the DL cells in the group if the associated secondary UL cell is active.

Alternatively, if the deactivation criteria for the secondary DL cell is met and the UE has determined to autonomously deactivate the secondary DL cell, the UE may deactivate the secondary UL cell associated with the secondary DL cell.

Alternatively, the associated secondary DL cell may be deactivated together with the secondary UL cell if the deactivation criteria above is met and one or a combination of the following additional criteria is met: (1) the secondary UL carrier or both primary and secondary UL cell are operating with UE_DTX_cycle_2, (2) the buffer status, (e.g., total E-DCH buffer status (TEBS)), is below a configured threshold, (3) the UE has not performed any UL transmission for a predefined period of time, and/or (4) the secondary UL carrier is deactivated. UE_DTX_cycle_2 defines the uplink DPCCH burst pattern length in subframes, which is longer than UE_DTX_cycle_1. The UE moves to UE_DTX_cycle_2 after a predetermined number of consecutive E-DCH transmit time intervals (TTIs) without an E-DCH transmission while in UE_DTX_cycle_1.

In case where the UE deactivates both secondary UL and DL cells, when the condition to re-activate the secondary DL cell is met, the UE may reactivate the secondary DL cell implicitly when data is received in the DL, or the UE may reactivate both the secondary UL and DL cells. The secondary UL cell may be reactivated upon an explicit order from the network. Both secondary UL and DL cells may be activated with an HS-SCCH order.

Alternatively, the secondary UL carrier may remain inactive until at least one of the following conditions are met: (1) the secondary cell or both primary and secondary cells are not operating with UE_DTX_cycle_2, or the UE is no longer in DTX, (2) the buffer status (e.g., TEBS), becomes or is above a configured threshold, (3) the UE has data to transmit, or the UE has data from a logical channel priority above a threshold, or the like.

The UE may be allowed to implicitly deactivate a secondary DL cell even if DRX is not configured in the UE. The embodiments for deactivation of the DL carrier described above are applicable to this case. For example, if the inactivity criteria are used and if the UE has not received any HS-SCCH or HS-PDSCH subframes for a predetermined number (e.g., deactivation_inactivity_threshold) of subframes, the UE may deactivate the secondary DL cell even though DRX is not configured in the UE. The threshold (deactivation_inactivity_threshold) may be a network configurable value, may be equivalent to or a function of an existing threshold, such as Inactivity_Threshold_for_UE_DRX_cycle, or predefined in the UE.

In case where the secondary cell is deactivated or reactivated explicitly by the HS-SCCH order, the UE transmits a hybrid automatic repeat request (HARQ) positive acknowledgement (ACK) to the network via a high speed dedicated physical control channel (HS-DPCCH). In case where the secondary cell is deactivated or reactivated implicitly (i.e., activated or deactivated by any means other than by an HS-SCCH order), the UE may or may not transmit the indication to the network. The HS-DPCCH format may remain the same after the autonomous activation or deactivation. Alternatively, the HS-DPCCH format may change as if the cell(s) is activated or deactivated by the HS-SCCH order.

For transmitting the indication to the network after the autonomous deactivation of the secondary carrier, the UE may feedback a special pre-defined channel quality indicator (CQI), a special pre-defined HARQ negative acknowledgement (NACK), or a special pre-defined precoding indicator (PCI) value (if the carrier was configured with multiple-input multiple-output (MIMO) before autonomous deactivation), or the like.

In case where the HS-DPCCH format is changed to send the indication after autonomous deactivation/reactivation, the UE may use the old HS-DPCCH format to signal the acknowledgment and then revert to the new one after transmitting the ACK/NACK or after sending the ACK/NACK a predefined amount of time.

Alternatively, the UE may use layer 2 signaling to notify the Node-B of the activation/deactivation of the secondary cell. This may be performed, for example, by using a MAC-i protocol data unit (PDU), where a special header or logical channel identity (LCH-ID) value may be used to signal the indication. Alternatively, a scheduling information (SI) with a special or reserved value may be used. If a change of format occurs in the HS-DPCCH, the UE may wait to receive an ACK over the E-HICH from the serving cell for the MAC-i PDU, prior to changing the HS-DPCCH format.

The monitoring of the inactivity for deactivation purposes may be performed using similar concepts to DRX monitoring as described below. More specifically, the deactivation inactivity threshold monitoring may be common, group-wise, or per-cell.

Two step DRX to autonomous deactivation of the secondary cell may be performed with a common DRX operation, a group-wise DRX operation, or per-cell basis DRX operation.

In case where the common DRX control is applied to all cells, the UE may enter DRX according to the Inactivity_Threshold_for_UE_DRX_cycle, (i.e., the UE has not received an HS-SCCH or an HS-PDSCH subframe during the last Inactivity_Threshold_for_UE_DRX_cycle subframes, excluding HS-SCCH orders), or the UE enters DRX upon initial configuration or upon an explicit HS-SCCH order for all carriers (including primary and all secondary carriers). The UE may then apply a deactivation monitoring operation that may be common, group-wise, or individual and deactivate one or more secondary cells if a predetermined criterion is met. For example, when the UE applies the same DRX control operation for all carriers and a group-wise, (e.g., per-band), inactivity timer is used for autonomous deactivation of secondary cells, if the inactivity timer for a group, (e.g., for the secondary band), expires, the UE may deactivate the secondary cells associated with the group, (e.g., secondary band), and not deactivate the cells in the other groups, (e.g., in the primary band). Alternatively, if more than two groups are configured, independent per group monitoring may be applied but if the criteria in one group is met, then all secondary cells belonging to a subset of the groups may be deactivated. The subset may belong to groups where no primary cells are present or the groups may be explicitly configured by the network. For example, if more than two bands are configured, and the timer in one band expires the UE may deactivate all secondary cells in the secondary bands, but not in the primary band. If more than two bands are configured for the UE, the UE may individually deactivate the secondary carriers configured in each secondary bands if the inactivity timer for that secondary band expires. Alternatively, the UE may deactivate all the secondary carriers regardless of the frequency band or regardless of the group in which the primary cell belongs. For example, if common deactivation threshold monitoring is performed, the inactivity threshold may be set for all cells and if the timer expires for all cells then the UE may deactivate all secondary cells. In another example, a per-cell inactivity threshold may be maintained, in which case the UE may deactivate the corresponding secondary cell. The same concept may apply if the deactivation threshold is independent from DRX state.

In case of the group-wise DRX control operation, the secondary cells in each cell group may be independently and autonomously deactivated within the group by using the common DRX state machine as in the common DRX control. The difference between the common DRX control and the group-wise DRX control operation is that the process for the automatic deactivation of the secondary cell s will not start until all carriers (or the primary cell) enter DRX for the common DRX control operation while different cell groups may enter their own DRX cycles at different times for the group-wise DRX control operation. The carrier group may be defined as described above. In another example, within the group that entered DRX, a per group deactivation inactivity monitoring may apply, where the group may be equivalent to the cells in the DRX group or to a subset of the cells in the DRX group.

In case of the per-cell basis DRX control operation, each carrier (except the primary carrier) may be independently and autonomously deactivated.

Deactivating a cell may cause an interruption to other carriers. In order to reduce the interruption time to other cells due to the autonomous deactivation of the secondary cell, the deactivation inactivity timer may be configured to link DRX of other cells. For example, the deactivation inactivity timer may be set such that the secondary cell may be deactivated if other cells are all in the sleep (idle) period of DRX of other cells which will not be deactivated. This may be applied within a cell group that causes the interruption, or all cells.

Alternatively, even if the expiry of the activation timer does not coincide with the DRX of other cells which may cause the interruption, after expiry of the inactivity timer the UE may wait until the cells which may be interrupted are not receiving, (e.g., either deactivated or are in idle period of the DRX cycle). If other cells are active, the UE may wait until those cells enter DRX (idle period) and then the UE deactivates the cell for which the timer expires. During the period after the inactivity timer expires and other cells are active, if the UE receives any data on that carrier, the UE may restart the inactivity timer, or alternatively, the UE may not restart the inactivity timer and wait for other cells to be in the idle period of the DRX cycle and then deactivate the cell. Alternatively, during that period (after expiration of the inactivity timer) the UE may consider the cell inactive for the purposes of reception and potentially HS-DPCCH feedback, but may not physically deactivate the cell until other corresponding cells meet the idle criteria.

Embodiments for coordinating reception or monitoring of DL channels while DRX is enabled are disclosed hereafter. DRX monitoring may be common to all cells, group-based, or individual cell-based.

In accordance with one embodiment, the same DRX monitoring may be applied to all DL cells, (i.e., all cells follow the same DRX monitoring). A single HS-SCCH reception pattern may be defined, and the UE may monitor on all DL cells simultaneously in accordance with the single HS-SCCH reception pattern. When DRX is enabled, the UE may receive DL physical channels on all DL cells if the UE has received an HS-SCCH or an HS-PDSCH subframe on any DL cell during the last Inactivity_Threshold_for_UE_DRX_cycle subframes which was not an HS-SCCH order. Other conditions for monitoring DL channels may be applied; (exceptions (1)-(7) defined above).

The same HS-SCCH reception pattern may be applied to all cells, and may be defined as the set of subframes whose HS-SCCH discontinuous reception radio frame number CFN_DRX and subframe number S_DRX verify the following:

$$((5 \times CFN\_DRX - UE\_DTX\_DRX\_Offset + S\_DRX) \bmod UE\_DRX\_cycle) = 0.$$

Figure 2:
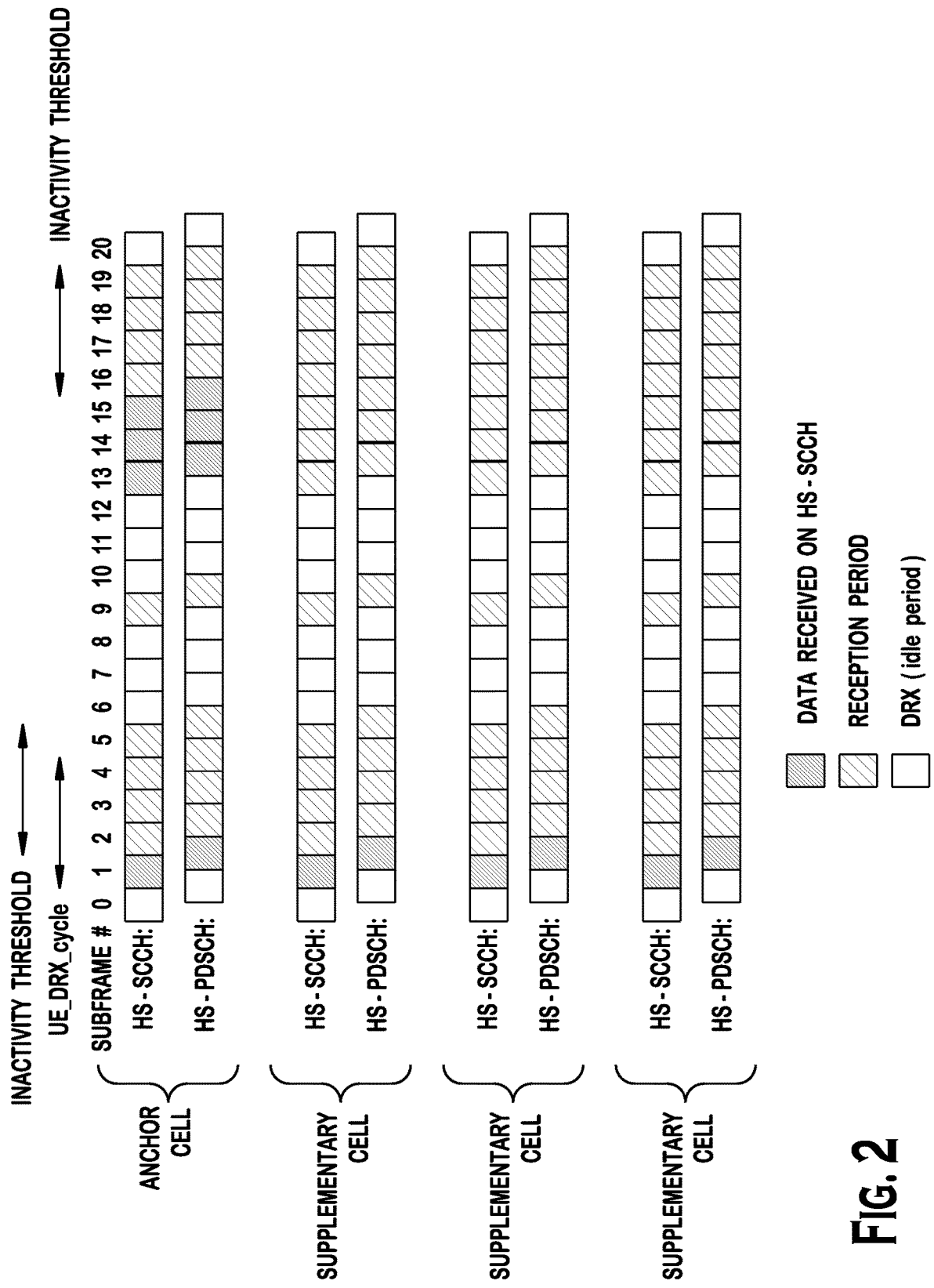
FIG. 2 shows an example of applying the same DRX monitoring to all carriers.

FIG. 2 shows an example of applying the same DRX monitoring to all carriers. In this example, the UE is configured with four cells (a primary cell and three secondary cells). The UE simultaneously monitors an HS-SCCH on a subframe determined based on the UE_DRX_cycle on all DL carriers. Once the HS-SCCH is successfully decoded (e.g., HS-SCCH subframe #1), the UE receives data on the corresponding HS-PDSCH (e.g., HS-PDSCH subframe #1), and continuously monitors the HS-SCCH and the HS-PDSCH and all other DL physical channels on all DL carriers for the Inactivity_Threshold_for_UE_DRX_cycle subframes (e.g., subframes 2-5). As shown in FIG. 2, the UE monitors subframe #9 on all carriers, and receives an HS-SCCH and HS-PDSCH on subframes #13-15 on the primary carrier and monitors all secondary carriers on subframes #13-15, and monitors all carriers on subframes #16-19.

The UE may autonomously deactivate a secondary cell or group thereof if no HS-SCCH or HS-PDSCH is received for the inactivity threshold. The inactivity timer for the autonomous deactivation may be common to all secondary carriers. In that case, the UE may deactivate a secondary cell, (all or a subset of secondary cells or a individual cell), autonomously if no HS-SCCH or HS-PDSCH is received on any of the cells for the inactivity threshold. The inactivity timer may be restarted upon reception of data on any of the cells.

Alternatively, the common DRX or equally the deactivation process independent of DRX may work with carrier-specific or group-specific (e.g. band-specific) timers. Once the UE has entered DRX using the common DRX monitoring on all carriers or once the UE is configured or starts the deactivation monitoring regardless of DRX, the inactivity timer may be monitored per-cell basis or per-group basis. The cell-specific timer is re-initiated if data is received on the given cell, and the group-specific timer is re-initiated if data is received on any of the cells associated with the group. Even if data is received on the other cell or a cell in another group, causing the UE to be in continuous burst reception on all the cells, the cell-specific timer or the group-specific timer continues to run unless data is received on that cell or one of the cells of the group, (e.g. band).

In case where the same DRX monitoring is applied to all cells and the activation of the secondary carriers is dependent on data reception, if an HS-SCCH or HS-PDSCH is received on any of the activated cells, all the autonomously deactivated cells, (i.e., the ones not deactivated explicitly by an order), may initiate data reception.

In accordance with another embodiment, DRX monitoring may be applied on a per-group basis. A cell group may be defined in accordance with any embodiments disclosed above. An HS-SCCH reception pattern is defined for each group and the UE monitors the HS-SCCH subframes on all cells in the group in accordance with the group-specific HS-SCCH reception pattern. The UE may receive DL channels on all carriers within the group simultaneously if the UE has received an HS-SCCH or an HS-PDSCH subframe during the last Inactivity_Threshold_for_UE_DRX_cycle (k) subframes on any of the carriers within the group, which was not an HS-SCCH order, where k is a group index. Other conditions for monitoring DL channels may be applied, (exceptions (1)-(7) defined above).

The HS-SCCH reception pattern for the $k^{th}$ group of cells may be defined as the set of subframes whose HS-SCCH discontinuous reception radio frame number CFN_DRX and subframe number S_DRX verify the following:

$$((5 \times CFN\_DRX - UE\_DTX\_DRX\_Offset(k) + S\_DRX)$$
$$MOD\ UE\_DRX\_cycle(k)) = 0,$$

where k is the index of the group of carriers (k=1, 2, . . . , K), and K is the total number of groups of cells. UE_DTX_DRX_Offset(k) may be the same for all cells. Alternatively, the same DRX pattern may be applied to all DL carriers.

UE_DRX cycle(k), Inactivity_Threshold_for_UE_DRX_cycle(k), and/or UE_DTX_DRX_Offset(k) may be configured for the $k^{th}$ group of cells for discontinuous DL reception and discontinuous UL DPCCH transmission by higher layers. UE_DRX cycle(k) defines the HS-SCCH reception pattern length in subframes for the $k^{th}$ group of cells. Inactivity_Threshold_for_UE_DRX_cycle(k) defines the number of subframes after an HS-SCCH reception or after the first slot of an HS-PDSCH reception during which the UE may monitor the HS-SCCHs in the UE's HS-SCCH set continuously with the exceptions of N_acknack_transmit>1 or InterTTI>1 for the $k^{th}$ group of cells. UE_DTX_DRX_Offset(k) defines the uplink DPCCH burst pattern and HS-SCCH reception pattern offset in subframes for the $k^{th}$ group of cells.

Figure 3:
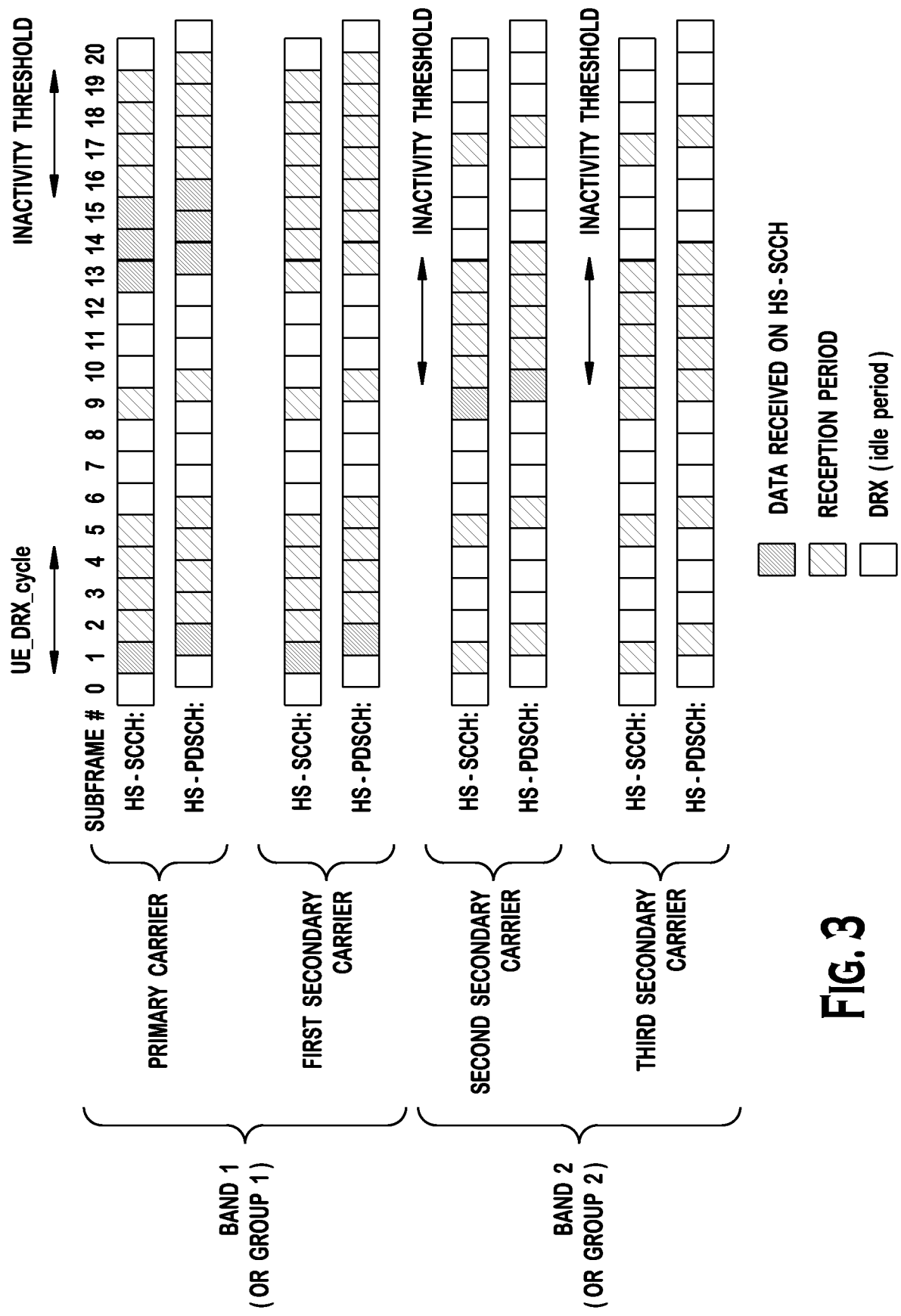
FIG. 3 shows an example group-wise DRX monitoring for a DL configuration having two groups of carriers, where each group includes all carriers within a band.

FIG. 3 shows an example group-wise DRX monitoring for a DL configuration having two groups of cells. As an example, each group may include all cells within a band (band 1 and band 2). As shown in FIG. 3, reception of an HS-SCCH or HS-PDSCH requires monitoring of DL channels for the cells within the same band (or group). In this example, the UE is configured with four cells (a primary cell and three secondary cells), and the cells are grouped into two groups (or bands). The UE simultaneously monitors an HS-SCCH on subframes determined based on the group-specific HS-SCCH reception pattern on all carriers in the group. The UE receives data on the HS-SCCH and HS-PDSCH on band 1 on subframe #1, and continuously monitors the HS-SCCH and the HS-PDSCH and all other DL physical channels on all DL cells in band 1 for the Inactivity_Threshold_for_UE_DRX_cycle subframes (i.e., subframes 2-5). The UE receives data on the HS-SCCH and HS-PDSCH on band 2 on subframe #9, and continuously monitors the HS-SCCH and the HS-PDSCH and all other DL physical channels on all DL carriers in band 2 for the Inactivity_Threshold_for_UE_DRX_cycle subframes (i.e., subframes 10-13). The UE also receives data on the HS-SCCH and HS-PDSCH on band 1 on subframes #13-15, and continuously monitors DL physical channels on all DL cells in band 1 for the Inactivity_Threshold_for_UE_DRX_cycle subframes (i.e., subframes 16-19).

In case where autonomous deactivation is performed, group-wise DRX monitoring is applied, and the activation of the secondary cells is dependent on data reception, if an HS-SCCH or HS-PDSCH is received on any one of the activated cells within the same group, the UE may reactivate the autonomously deactivated cells in the same group. cells belonging to the other group may maintain the deactivated status.

The UE may autonomously deactivate a secondary carrier in a group if no HS-SCCH or HS-PDSCH is received on any cell in the group for the inactivity threshold associated with the group. The inactivity timer for the autonomous deactivation may be common to all secondary cells in the group. In that case, the UE may deactivate a secondary cell autonomously if no HS-SCCH or HS-PDSCH is received on any of the carriers for the inactivity threshold. The inactivity timer may be restarted upon reception of data on any of the cells in the group.

Alternatively, the inactivity timer may be cell-specific within the group that has entered DRX. In this case, once the UE has entered DRX in one of the groups the inactivity timer is restarted on a per-cell basis within the group, and even if data on the other cell is received, causing the UE to be in continuous burst reception, the inactivity timer for the cell continues to run unless data is received on that cell, at which point the inactivity timer is restarted. It should be understood that even though the group-wise, cell-specific, and common deactivation monitoring procedures are described after the UE enters DRX they are equally applicable when the deactivation monitoring is performed independent of DRX.

In accordance with another embodiment, DRX monitoring may be applied on a per-cell basis. For example, for the $k^{th}$ DL cell, an HS-SCCH reception pattern may be defined such that the UE monitors the HS-SCCH subframes in the HS-SCCH reception pattern, and receives DL channels on the $k^{th}$ cell if the UE has received an HS-SCCH or an HS-PDSCH subframe during the last Inactivity_Threshold_for_UE_DRX_cycle(k) subframes on the $k^{th}$ cell, which was not an HS-SCCH order. Other conditions for monitoring DL channels may be applied, (exceptions (1)-(7) defined above).

The HS-SCCH reception pattern for the $k^{th}$ cell may be defined as the set of subframes whose HS-SCCH discontinuous reception radio frame number CFN_DRX and subframe number S_DRX verify the following.

$$((5 \times CFN\_DRX - UE\_DTX\_DRX\_Offset(k) + S\_DRX)$$
$$MOD\ UE\_DRX\_cycle(k)) = 0.$$

Alternatively, the same DRX pattern may be applied to all DL carriers.

Figure 4:
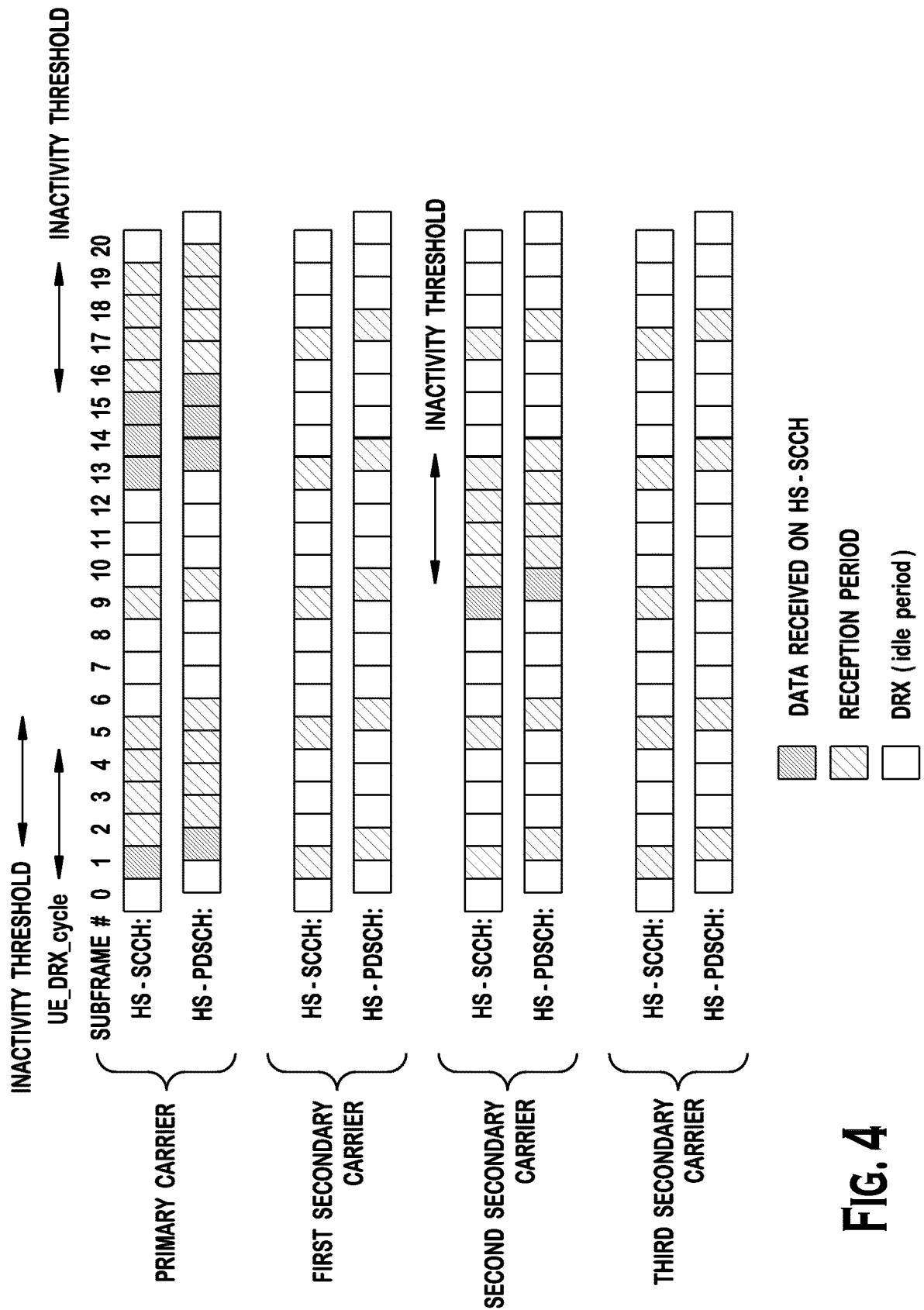
FIG. 4 shows an example per-carrier DRX monitoring.

FIG. 4 shows an example per-cell DRX monitoring. As shown in FIG. 4, reception of HS-SCCH or HS-PDSCH in any given cell will not cause another carrier to continue reception of DL channels.

The UE may autonomously deactivate a secondary cell if no HS-SCCH or HS-PDSCH is received on the secondary cell for the inactivity threshold associated with the secondary carrier. The inactivity timer for the autonomous deactivation may be common to all secondary carriers. The inactivity timer may be restarted upon reception of data on the secondary carrier.

In case where autonomous deactivation is performed, per-cell DRX monitoring is applied, and the activation of the secondary carriers is dependent on data reception, if an HS-SCCH or HS-PDSCH is received on any of the activated carriers, the UE may continue to stay deactivated until explicitly instructed by the network. Alternatively, the UE may reactivate one or more carriers if data is received continuously for a period of time as described above.

As stated above, the autonomous deactivation of the secondary cell (e.g. the UE deactivates the secondary cells after the inactivity timer expires from the initiation of the DRX), may work with a common DRX monitoring, a group-wise DRX monitoring, or per-cell basis DRX monitoring. Once the UE enters DRX, the UE may start monitoring the inactivity timer, (common, group-specific, or carrier-specific), and autonomously deactivate a secondary cell once the inactivity timer expires.

Multi-tier DRX may be applied to all or a subset of the cell. With the multi-tier DRX, the UE is configured with multiple DRX cycles, (e.g., DRX cycle 1 and DRX cycle 2 for two-tier DRX). One DRX cycle may be a factor of another DRX cycle. The UE may enter DRX cycle 1 according to any embodiments disclosed herein, for example according to the common DRX monitoring. Upon initiation of UE_DRX_cycle 1, the UE may initiate monitoring for an inactivity threshold, which may be the same as the conventional inactivity threshold, (e.g., Inactivity_Threshold_for_UE_DRX_cycle), a newly defined value, (say, Inactivity_Threshold_for_UE_DRX_cycle_2), a multiplicative of the Inactivity_Threshold_for_UE_DRX_cycle, or may correspond to deactivation_inactivity_threshold per cell, or per group of cells.

Once the UE enters DRX cycle 1, it may start per-cell or per-group monitoring for DRX cycle 2. For example, the UE may initiate Inactivity_Threshold_for_UE_DRX_cycle_2 timer or counter. If no HS-SCCH or HS-PDSCH is received on a carrier for Inactivity_Threshold_for_UE_DRX_cycle_2 subframes, the UE may enter DRX cycle 2. If the UE receives data on other cell during the time Inactivity_Threshold_for_UE_DRX_cycle_2 is running, which causes the UE to be in burst reception on all cells, the UE may not re-initiate the Inactivity_Threshold_for_UE_DRX_cycle_2 timer/counter even though the UE may be monitoring the HS-SCCH on the given carrier. Alternatively, the timer or counter may be re-initiated if data is received on the given carrier while the Inactivity_Threshold_for_UE_DRX_cycle_2 timer is running.

Once the UE enters DRX cycle 2, it may remain in DRX cycle 2 unless otherwise ordered by the network. Alternatively, if data is received on that carrier the UE may go on continuous reception and move to DRX cycle 1 once no HS-SCCH or HS-PDSCH are received for Inactivity_Threshold_for_UE_DRX_cycle sub-frames, and start again the Inactivity_Threshold_for_UE_DRX_cycle_2 timer/counter.

The DRX cycle 2 parameters including the Inactivity_Threshold_for_UE_DRX_cycle_2 may be configured per-cell or per-group of carriers. These parameters may be configured explicitly or may correspond to a factor of DRX cycle 1 parameters. If a DRX cycle 2 set to infinity or a special reserved value may correspond to a UE autonomous deactivation.

Embodiments for DRX control and monitoring upon carrier activation are disclosed hereafter. The cell may be activated either through an explicit HS-SCCH order or autonomously in accordance with any embodiments disclosed above. When the cell is activated/reactivated, the DRX control/monitoring operation may be initialized as normal network initial configuration. The DRX control/monitoring operation which was stopped by the HS-SCCH order or autonomous deactivation may resume. Alternatively, the DRX control/monitoring operation may be disabled after cell activation either through an explicit HS-SCCH order or autonomous reactivation. When resuming the DRX operation, the same DRX status may be applied as currently applied to the primary carrier, all active cells, or all other active cells within the same group of carriers. For example, if a common DRX state machine is used, the secondary cell may align with the primary cell DRX control/monitoring after cell activation through an explicit HS-SCCH order or autonomous reactivation.

Embodiments for controlling reception of F-DPCH based on DTX for MC-HSPA are disclosed hereafter.

A single UL_DTX_Active state variable may be maintained for all UL cells. The UE may determine whether it needs to receive an F-DPCH for the associated (paired) DL cell, the associated group of DL carriers, or all DL carriers based on the rules described below. A single UL_DTX_Active state variable may be maintained and evaluated on a per-cell, per-group of cells, or all UL carriers basis. UL_DTX_Active is set to TRUE while UE_DTX_DRX_Enabled is TRUE and discontinuous uplink DPCCH transmission is activated. Otherwise, UL_DTX_Active is set to FALSE. UE_DTX_DRX_Enable is set to TRUE after the higher layer has set DTX_DRX_STATUS to TRUE and Enabling_Delay radio frames have passed. Otherwise, UE_DTX_DRX_Enabled is set to FALSE. Discontinuous UL DPCCH transmission is activated at the time when UE_DTX_DRX_Enabled is set to TRUE, and may be further deactivated or activated by the layer 1 HS-SCCH orders.

The following may be then performed on individual, per-group of cell, or all UL cells basis. When UL_DTX_Active is FALSE, the UE may continue to receive an F-DPCH. When UL_DTX_Active is TRUE, the UE may not receive an F-DPCH in any DL slot starting during a UL DPCCH slot which is in a UL DPCCH transmission gap as a transmit power control (TPC) command may not be transmitted during this period.

To achieve power savings, the UE may stop all F-DPCH related procedures during periods when a TPC command is not received. When a TPC command is received, the UE may perform F-DPCH related procedures. The F-DPCH related procedures may include the following: the UE may combine UL TPC commands for UL power control, the UE may check synchronization status of the F-DPCH for each radio frame in which the F-DPCH transmission is known to be present in at least one slot, and report it to higher layers, or the UE may apply in the signal-to-interference ratio (SIR) target value adjustment any TPC commands received in an F-DPCH slot starting during a UL DPCCH slot which is in a UL DPCCH transmission gap.

Generally, the UE receiver may be partitioned into two parts as a radio frequency (RF) front end, and a baseband unit. In order to maximize the UE power efficiency the UE receiver (the RF front end and/or the baseband unit) may be turned on and off.

In order to turn on and off the receiver circuitry for the reception of HSPA channels and an F-DPCH, the UE may evaluate each group of carriers if any of the following criteria are met, (i.e., whether reception of the corresponding channel(s) for the associated carrier(s) is necessary):

(1) Criteria 1: Reception of HSPA channels for all associated carriers;

(2) Criteria 2: Reception of an F-DPCH for all associated carriers;

(3) Criteria 3: Reception of HSPA channels for DL transmissions for all associated carriers;

(4) Criteria 4: Reception of HSPA channels for UL transmissions for all associated carriers;

(5) Criteria 5: Reception of HSPA channels for DL activity for all associated carriers; and (6) Criteria 6: Reception of HSPA channels for UL activity for all associated carriers.

It should be noted that even though the above criteria are defined on per-group of carrier basis, all of the criteria defined above may be applied with the group comprising a single carrier, or a single group including all carriers. It should also be noted that additional criteria may be defined for the UE receiver architecture design and power islands arrangement. It should also be noted that one or more criteria may be used to create a Criteria Set for control of turning off/on all or part of the UE receiver and/or transmitter circuitry implementing the reception of the DL channels associated with the Criteria Set.

Embodiments for turning on/off the UE RF front end unit is disclosed in terms of the group-wise DRX/DTX control criteria. An RF front end unit may be associated with carriers from multiple groups of carriers. In this case, the UE may turn on and off the RF front end unit based on multiple groups of carriers. Multiple groups of carriers refer to all groups of carriers associated with the same RF front end unit to be turned on and off after the UE evaluates Criteria 1 and Criteria 2 for all associated groups of carriers (Criteria 2 is not needed if there is no UL carrier associated with the group of carriers). If the UE does not need to receive DL channels on all associated groups of carriers at the same time, the UE may turn off the UE RF front end unit. Otherwise, the UE turns on the UE RF front end. For example, if a single RF front end unit is associated with all carriers, and the UE does not need to receive DL channels on all carriers in terms of Criteria 1 and 2, the UE may turn off the RF front end unit. Otherwise, the RF front end unit is turned on.

An RF front end unit may be associated with one group of carriers. Assume that K RF front end units are associated with the K carrier groups. The UE independently turns on and off K RF front end units on a per-carrier group basis after the UE evaluates both Criteria 1 and Criteria 2 for each group of carriers (Criteria 2 is not needed if there is no UL carrier associated with the group of carriers). If the UE does not need to receive DL channels on the $k^{th}$ group of carriers, the UE may turn off the $k^{th}$ RF front end unit associated with the $k^{th}$ group of carriers. Otherwise, the $k^{th}$ RF front end unit is turned on. By doing so, K RF front end units may be turned off/on at different time for K groups of carriers. Each RF front end unit may be designed for any carriers in a band, and DRX/DTX group may be defined with any carriers in a band.

An RF front end unit may be associated with a sub-group of carriers within a carrier group. Assume that M RF front end units are associated with M sub-groups of carriers that belong to the same group, ($k^{th}$ group of carriers).

In accordance with one embodiment, the UE may simultaneously turn on and off the M RF front end units on a per-carrier group basis after the UE evaluates the Criteria 1 and Criteria 2 for all carriers in the $k^{th}$ group. If the UE does not need to receive DL channels on the $k^{th}$ group of carriers, the UE may turn off the M RF front end unit associated with the $k^{th}$ group of carriers. M RF front end units may be turned on and off at the same time for the M sub-groups of carriers.

Alternatively, the UE may independently turn on and off the M RF front end units on a per-sub-carrier group basis. If the UE does not need to receive DL channels on the a given sub-group of carriers, the UE may turn off the RF front end unit associated with that sub-group of carriers. With this scheme, the M RF front end units may be turned on and off at different times for the M sub-groups of carriers.

Alternatively, regardless of the association between the RF front end units and the carriers, the RF front end units may be turned on regardless of the DRX/DTX control criteria.

Embodiments for turning on and off the baseband processing units are disclosed.

When the UE turns off the RF front end unit, the UE may also turn off the baseband processing unit which is associated with the same carriers as the RF front end unit.

When the UE turns on the RF front end unit, the UE may turn off all or part of the baseband processing unit which is associated with the same carriers as the RF front end unit in terms of the criteria set. The criteria set is a set of one or more individual criteria defined above. Each criteria set corresponds to a baseband circuitry which may implement the reception of one or more DL channels associated with the criteria set and may be independently turned on and off. The criteria sets may be used for the UE receiver architecture design and power islands arrangement from the DRX/DTX power saving perspective.

Given a group-wise DRX/DTX control criteria set, the UE baseband circuitries associated with the given criteria set may be turned on and off based on the given criteria set. A baseband circuitry may be associated with carriers from multiple groups of carriers. In this case, the UE may turn on and off the baseband circuitry on a multiple groups of carriers basis after evaluating the given criteria set for all associated groups of carriers. Multiple groups of carriers refer to all groups of carriers associated with the same baseband circuitry to be turned on and off. If the UE does not need to receive DL channels on all associated groups of carriers at the same time, the UE may turn off the baseband circuitry for the reception of the DL channels associated with the given criteria set.

A baseband circuitry may be associated with all carriers of a carrier group. Assume that K baseband circuitries are associated with K carrier groups for a given criteria set. The UE may independently turn on and off the K baseband circuitries on a per-carrier group basis after evaluating the given criteria set for each group of carriers. If the UE does not need to receive DL channels on the $k^{th}$ group of carriers, the UE may independently turn off the $k^{th}$ baseband circuitry for the reception of the DL channels associated with the given criteria set. With this scheme, the K baseband circuitries for the reception of the DL channels associated with the given criteria set may be turned on and off at different times for the K groups of carriers.

A baseband circuitry may be associated with a sub-group of carriers within a carrier group. Assume that M baseband circuitries are associated with M sub-groups of carriers which belong to the $k^{th}$ group of carriers.

In accordance with one embodiment, the UE may simultaneously turn on and off the M baseband circuitries on a per-carrier group basis after evaluating the given criteria set for all carriers in the $k^{th}$ group. If the UE does not need to receive DL channels on the $k^{th}$ group of carriers, the UE may turn off the M baseband circuitries for the reception of the DL channels associated with the given criteria set over all carriers in the $k^{th}$ group.

Alternatively, the UE may independently turn on and off the M baseband circuitries on a per-sub-carrier group basis. If the UE does not need to receive DL channels on the given sub-group of carriers, the UE may turn off the M baseband circuitries for the reception of the DL channels associated with the given criteria set over all carriers in the sub-group.

Alternatively, regardless the association between the baseband circuitry and the carriers, the baseband circuitry may be turned on given the DRX/DTX control criteria set.

To control of turning off/on all of UE baseband circuitries for a particular carrier group, multiple criteria sets may be created for the reception of all DL channels including E-HICH, HS-SCCH, HS-PDSCH, E-AGCH, E-RGCH and F-DPCH if they may be received on any carrier in that group. Criteria sets may be created individually for each group of carriers. Alternatively, the criteria sets may be common for all groups of carriers. The same criteria sets may be used for all groups of carriers with their baseband circuitries on the same power island.

Figure 5:
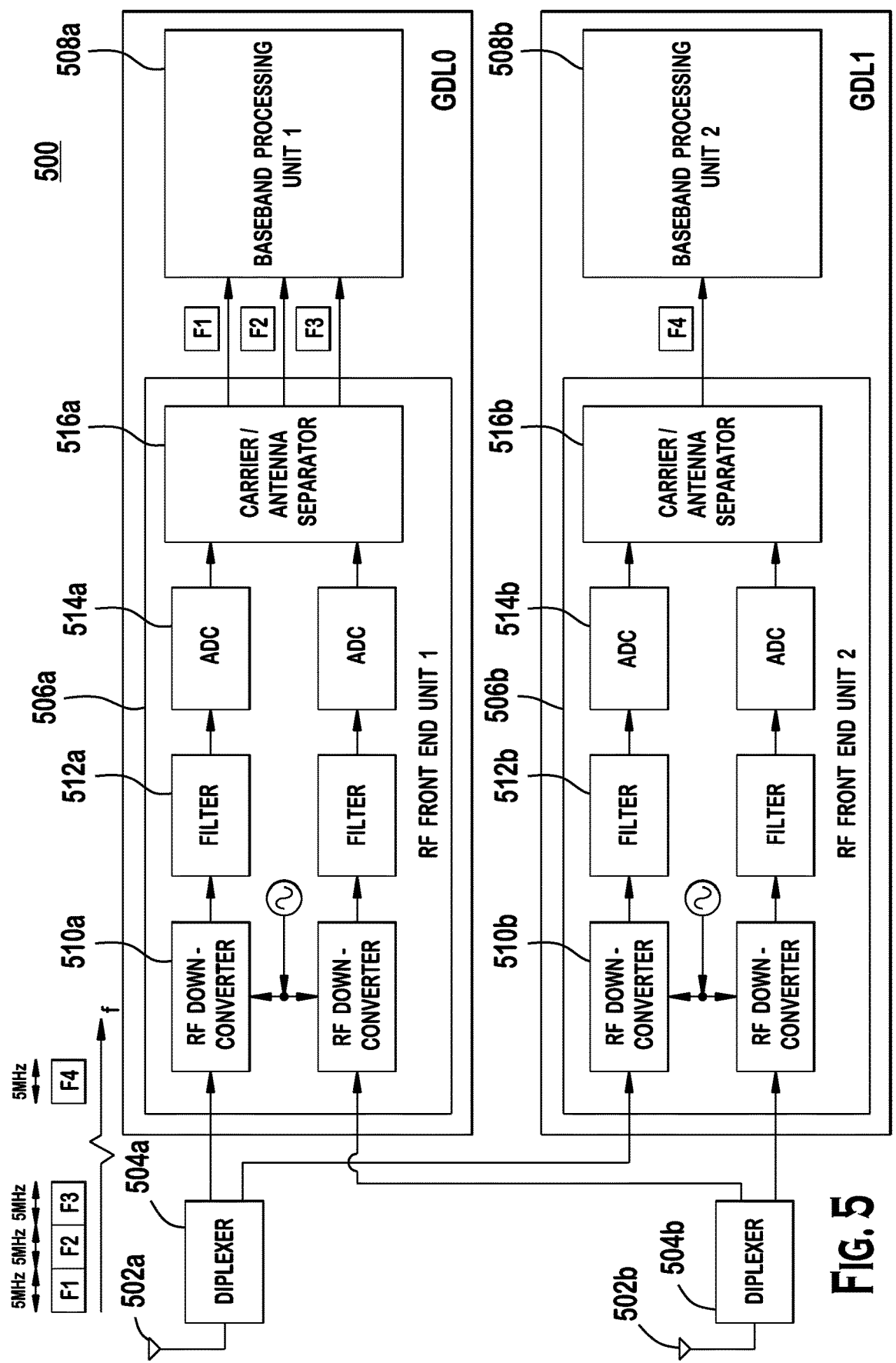
FIG. 5 shows an example for controlling the UE baseband processing units.

For example, an MC-HSPA system is configured with 4 DL carriers: three carriers (F1, F2, F3) belong to group 0 (GDL0) and one carrier (F4) belongs to group 1 (GDL1). FIG. 5 shows an example for controlling the UE baseband processing units by applying criteria 1 and criteria 2 as two criteria sets to both GDL0 and GDL1, (i.e., both criteria 1 and 2 are applied to both groups of carriers). The UE 500 may include one or more antenna 502a, 502b, one or more diplexer 504a, 504b, a plurality of RF front end units 506a, 506b, and a plurality of baseband processing units 508a, 508b. The RF front end units 506a, 506b may comprise an RF down-converter 510a, 510b, a filter 512a, 512b, an analog-to-digital converter (ADC) 514a, 514b, a carrier/antenna separator 516a, 516b, etc. The baseband processing units 508a, 508b include circuitries for processing HSPA-related channels and an F-DPCH, etc. In this example, the UE is configured with four carriers, (F1, F2, F3, and F4), in two bands, (F1-F3 in band 1, and F4 in band 2). The bandwidth of each carrier may be 5 MHz, or any other bandwidth. The first RF front end unit 506a and the first baseband processing unit 508a process for the carriers in the first group (F1, F2, and F3) and the second RF front end unit 506b and the second baseband processing unit 508b process for the carriers in the second group (F4). For each criteria set, the UE 500 independently controls turning on and off the corresponding baseband circuitries for each group.

With respect to the first criteria set (criteria 1), if the UE does not need to receive DL channels other than the F-DPCH on the $k^{th}$ group of carriers (k=0 or 1 in this example), the UE 500 may turn off the baseband circuitry for receiving the DL channels other than the F-DPCH for all carriers in the $k^{th}$ group.

With respect to the second criteria set (criteria 2), if UL_DRX_Active is TRUE and no TPC command is transmitted in any DL slot starting during a UL DPCCH slot which is in a UL DPCCH transmission gap, the UE may turn off the baseband circuitry for receiving the F-DPCH for all carriers in the $k^{th}$ group. In addition, when turning off the receiver circuitry for the reception of the F-DPCH, the UE may turn off the corresponding transmitter circuitry for the UL carrier associated with the F-DPCH, which may further maximize the UE power savings.

It should be noted that implementation shown in FIG. 5 is provided as an example, and the controlling may be performed with any criteria sets that may be applied to any number of groups of carriers, and the UE may employ any architectures including but not limited to a direct conversion architecture or super heterodyne architecture, etc.

Embodiments for activation and deactivation of DRX and/or DTX are disclosed hereafter. It should be noted that the embodiments below are applicable to any multi-carrier system with any number of DL and/or UL carriers that requires the network to send one or more orders (or commands) to the UE to activate or deactivate DRX and/or DTX. The terminologies "carrier" and "cell" may be used interchangeably. It is understood that DL carrier and serving HS-DSCH cell may also be used interchangeably in MC-HSDPA or MC-HSUPA system. The embodiments may be applied for activation and deactivation of DRX and/or DTX in HSDPA multipoint transmissions operations where one or more cells may operate on a single frequency in the sense of cell. Alternatively, the embodiments may also be applied for activation and deactivation of DRX and/or DTX in HSDPA multipoint transmission system in the sense of frequency, i.e., in case more than one cells are carried over a single frequency, the HS-SCCH order for activation/deactivation of DRX/DTX of a frequency may activate/deactivate DRX/DTX on all cells on that frequency simultaneously.

In accordance with one embodiment, the Node-B may explicitly indicate to the UE to activate or de-activate DRX. The activation or de-activation may be applied to all DL carriers, to a group of DL carriers, or to an individual DL carrier.

The conventional signaling, (i.e., HS-SCCH order), may be used to signal the explicit indication for DRX activation/deactivation which applies to all DL carriers. The HS-SCCH order includes three order type bits and three order bits. For example, if the order type $x_{odt,1}$, $x_{odt,2}$, $x_{odt,3}$='000', and the DRX activation bit $x_{drx,1}$='0', the HS-SCCH order is a DRX de-activation order, and if $x_{drx,1}$='1', the HS-SCCH order is a DRX activation order. The command received on the HS-SCCH order may be applied to the DL_DRX_Activate variable that is used to control the DRX operation for the targeted carrier group.

The UTRAN may transmit an explicit signal for DRX activation or de-activation of a group of carriers as described above simultaneously by using one or any combination of the following embodiments.

In accordance with a first embodiment, a new order type of the HS-SCCH order may be defined to indicate which group of carriers the DRX activation/deactivation applies to with the conventional order bits of the HS-SCCH order for DRX activation/deactivation. Each order type may be mapped to one particular group of carriers. 3 order type bits may be mapped to up to 8 carrier groups. The group may be indicated by the numerical representation of the order type. For example, order type $x_{odt,1}$, $x_{odt,2}$, $x_{odt,3}$='000', '001' and '010' may indicate that the DRX activation/deactivation order is applied to carriers in group 0, group 1, and group 2, respectively. A special group (say group 0) may be defined as including all DL carriers, such that with order type $x_{odt,1}$, $x_{odt,2}$, $x_{odt,3}$='000' the conventional DRX signaling in R9 DC-HSUPA may be performed.

Alternatively, a new order type may be defined such that each order type bit may be mapped to a particular group or groups of carriers. By doing so, one new order type with 3 order type bits may address 3 carrier groups simultaneously, and the DRX activation/deactivation order may (or may not) be applied to the mapped group of carrier when the corresponding bit of order type is equal to 1 (or 0). For example, $x_{odt,1}$, $x_{odt,2}$, $x_{odt,3}$ set to '101' may indicate that the DRX activation/deactivation order is directed to group 0 and group 2, while maintaining the current status for group 1.

In accordance with another embodiment, new order types and new order bits may be defined. The new order type bits may indicate an DRX activation/deactivation order for multiple groups of carriers simultaneously using the order bits. The all three order bits may be used to indicate a DRX activation/deactivation and may not be used for activation/deactivation of DTX and/or HS-SCCH-less operation. The value of each binary order bit (0/1) may represent deactivation/activation or activation/deactivation order for the targeting group of carriers. In accordance with this embodiment, with one order type, DRX activation/deactivation order for three groups of carriers may be indicated. For example, the new order type bits $x_{odt,1}$, $x_{odt,2}$, $x_{odt,3}$='100' may indicate that the HS-SCCH order is a DRX activation/deactivation order applied to 3 groups of carriers that are determined by the order bits. For example, the order bits $x_{ord,1}$, $x_{ord,2}$, $x_{ord,3}$ may indicate the DRX activation/deactivation orders for group 0, group 1, and group 2, respectively. It should be understood that the carrier group-to-order bit may be mapped in any configurable way.

Alternatively, the reserved order ($x_{ord,1}$, $x_{ord,2}$, $x_{ord,3}$='10X', i.e., $x_{drx,1}$, $x_{dtx,1}$='10' is a reserved combination) for Release 10, may be used to indicate an DRX activation/deactivation order applied to multiple groups of carriers that may be determined by the order type bits in any way described in the first embodiment above.

Alternatively, two new order types may be defined to indicate DRX activation and deactivation order while the order bits indicate which group of carriers the DRX activation/deactivation order applies to. For example, if the order type $x_{odt,1}$, $x_{odt,2}$, $x_{odt,3}$='110', the order may be an DRX deactivation order for the group of carriers with an index indicated by $x_{ord,1}$, $x_{ord,2}$, $x_{ord,3}$. If order type $x_{odt,1}$, $x_{odt,2}$, $x_{odt,3}$='111', the order may be a DRX activation order for the group of carriers with an index indicated by $x_{ord,1}$, $x_{ord,2}$, $x_{ord,3}$. The other carriers (not indexed by $x_{ord,1}$, $x_{ord,2}$, $x_{ord,3}$) may not be affected by the order. One particular group of carriers may be indicated by the numerical representation of the three order bits. For example, if $x_{odt,1}$, $x_{odt,2}$, $x_{odt,3}$='111' and $x_{ord,1}$, $x_{ord,2}$, $x_{ord,3}$='101', the UE may activate DRX for group 6. Alternatively, the three order bits may indicate multiple groups of carriers simultaneously by mapping each order bit to one of the groups of carriers. For example, each of the three order bits $x_{ord,1}$, $x_{ord,2}$, $x_{ord,3}$ may be mapped group 0, group 1, and group 2, respectively, and when $x_{odt,1}$, $x_{odt,2}$, $x_{odt,3}$='111' and $x_{ord,1}$, $x_{ord,2}$, $x_{ord,3}$='101' are received, the UE may activate DRX for group 0 and group 2.

Alternatively, a part of six bit HS-SCCH order including three bit order type and three bit order may be redefined or reinterpreted as a DRX activation/deactivation order for a group or groups of carriers and the location of the new defined command among 6 bit HS-SCCH order indicate which group of carriers, For example, "00" is a DRX deactivation order while "11" is a DRX activation order. HS-SCCH order (xodt,1, xodt,2, xodt,3, xodt,1, xodt,2, xodt,3)="001100" and "000011" could respectively DRX the GDL2 and GDL1. It's understood that the mapping between the location of the new defined DRX command in the HS-SCCH order and group of carriers can be take a different form. Moreover, it's understood that the pattern of the new defined DRX activation/deactivation command could be take a different form.

Alternatively, a single HS-SCCH order may be used for simultaneous activation/deactivations of DRX for all carrier groups, i.e., a single HS-SCCH order may indicate DRX activation and/or deactivation of any of all configured DL carriers simultaneously. Each HS-SCCH order represented by the order type in combination with the order bit may indicate one state for all configured DL carriers, and the mapping between orders and states may be pre-defined or specified in a look-up table in any order.

In accordance with another embodiment, the HS-SCCH number may be used to implicitly indicate the group or groups of carrier to which the HS-SCCH order is applied. For example, in case where three groups of carriers (GDL1, GDL2 and GDL3) are configured, if (HS-SCCH number) mod 2=0, the HS-SCCH order may be for GDL1, if (HS-SCCH number) mod 2=1, the HS-SCCH order may be for GDL2 and GDL3. It should be noted that the above example may be extended to any other mapping of the HS-SCCH number and the carrier group or groups, and the HS-SCCH number may be used to indicate any number of groups or bands to which the HS-SCCH order is applied, (e.g., in general, "(HS-SCCH number) mod n" may be used to control n groups or bands of carriers).

In accordance with another embodiment, the group or groups of carriers for which a DRX deactivation is targeted may be implicitly determined based on the carrier (or the group that the carrier belongs to) that the HS-SCCH order is received. For example, the UE may deactivate the DRX on the group of carriers that the UE receives the DRX deactivation order on one or more of the corresponding group of carriers. DRX activation orders may be sent on any carrier of the other active groups.

The embodiments disclosed above for DRX activation/de-activation of a group of carriers may be applied for DRX activation/deactivation of a group including a single carrier. The DRX activation/deactivation order via the HS-SCCH order in accordance with any embodiments disclosed above may be applied to setting the DL_DRX_Activate variable that is used to control DRX operation for the targeted carrier group.

In accordance with another embodiment, multiple HS-SCCH orders may be signaled to explicitly indicate DRX activation/deactivation of all DL carriers, multiple groups of carrier, and/or multiple individual carriers. As an HS-SCCH order may be transmitted on any carriers, multiple serving cells may signal multiple HS-SCCH orders. Different HS-SCCH orders may have different order type and/or different order in accordance with any embodiment disclosed above.

In case where multiple HS-SCCH orders may address the same carrier, the DRX activation and deactivation orders may be in conflict. In that situation, the UE may follow the order applied to all carriers and ignore the rest. Alternatively, the UE may follow the order applied to a group of carriers including the given carrier and ignore the rest. Alternatively, the UE may follow the order applied to the individual carrier. Alternatively, the UE may combine the HS-SCCH orders by using the majority rule. Alternatively, the UE may ignore all of them and maintain the current configuration.

The UTRAN may explicitly indicate to the UE to activate or deactivate DTX. The activation or deactivation order may be applied to all UL carriers, a group of UL carriers, and individually per UL carrier. Any embodiments disclosed above for DRX activation/deactivation may be applied to DTX activation/deactivation by replacing DRX with DTX and setting $x_{ord,2}$=$x_{dtx,1}$ where it applies. The DTX activation/deactivation order received on the HS-SCCH order may be applied to the UL_DTX_Active variable that is used to control the reception of an F-DPCH based on DTX for MC-HSPA.

The Node-B may indicate to the UE to jointly activate or deactivate DRX and DTX for a pair of associated DL and UL carriers in MC-HSPA system. This joint activation or deactivation order may be applied to all associated DL and UL carriers, a group of associated DL and UL carriers, or individually per pair of associated DL and UL carriers.

In order to explicitly signal joint activation and deactivation of DRX and DTX for the associated DL and UL carriers (or group of or all carriers), any of the embodiments disclosed above may be used for 2 bit (DRX, DTX) order (xdrx,1, xdtx,1). The association between DL and UL carriers may be pre-defined or signaled or indicated by higher layers (e.g. RRC message). The association may refers a paired DL and UL radio frequencies, or the UL carrier carries the relevant information (such as HARQ ACK/NACK and CQI, etc.) of the associated DL carriers, or the DL carrier carries the relevant information used for the associated UL carrier transmission. For example, '11' may indicate activation of both DRX and DTX at the UE, '01' may indicate deactivation of DRX and activation of DTX at the UE, and '00' may indicate deactivation of both DRX and DTX at the UE. The order bits '10X' may be a reserved combination for a pair of associated UL and DL carriers. The joint DRX/DTX activation/deactivation order received on the HS-SCCH order may be applied to the DL_DRX_Activate variable and UL_DTX_Active variable.

Embodiments for activation and deactivation of secondary serving HS-DSCH cells and secondary uplink frequencies for 8 carrier HSDPA (8C-HSDPA) are disclosed hereafter. The embodiments may be extended to more or less than eight carrier cases. With eight DL carriers and up to four UL carriers, such as (8DL+1UL), (8DL+2UL), (8DL+3UL) and (8DL+4UL), the total number of the activation/deactivation status of the DL and UL carriers and the number of bits required to represent the activation/deactivation states are listed in Table 2.

TABLE 2

| Configuration of DL and UL carriers | Total number of activation/deactivation carrier states | Number of bits required |
|---|---|---|
| 8DL + 1UL | $2^7 = 128$ | 7 bits |
| 8DL + 2UL | $2^7 + 2^6 = 128 + 64 = 192$ | 8 bits |
| 8DL + 3UL | $2^7 + 2*2^6 + 2^5 = 128 + 64*2 + 32 = 288$ | 9 bits |
| 8DL + 4UL | $2^7 + 3*2^6 + 3*2^5 + 2^4 = 128 + 3*64 + 3*32 + 16 = 432$ | 9 bits |

As shown in Table 2, the number of bits required to represent 8C-HSDPA configuration is no less than 7 bits. However, the conventional HS-SCCH order includes only 6 bits comprising 3 bits of order type ($x_{odt,1}$, $x_{odt,2}$, $x_{odt,3}$) and 3 bits of order ($x_{ord,1}$, $x_{ord,2}$, $x_{ord,3}$), which is not enough to represent all 8C-HSDPA configurations. Embodiments disclosed below address this issue. It should be noted that although the embodiments below are described in the context of 8C-HSDPA with different UL carrier configuration, the embodiments may be applied to any multi-carrier system with any number of DL and/or UL carriers that requires the network to send one or more orders (or commands) to the UE to activate/deactivate the secondary DL cell(s) and/or secondary UL frequency or frequencies. The terminologies "carrier" and "cell" may be used interchangeably. In this case, multi-cell may refer to multi-carrier and secondary cell and secondary carrier may be used interchangeably. It should be understood that secondary DL carrier and secondary serving HS-DSCH cells can be used interchangeably in MC-HSDPA or MC-HSUPA system. The embodiments may also be applied to activate/deactivate the secondary cells in HSDPA multipoint transmission operations where one or more cells operating on a single frequency. Alternatively, the embodiments may also be applied to activate/deactivate the secondary frequency in HSDPA multipoint transmission system, i.e., in case more than one cell is carried over a single frequency, the HS-SCCH order for activation/deactivation of the secondary frequency may activate and deactivate all cells on that frequency.

In accordance with one embodiment, a single conditioning HS-SCCH order may be used to activate and/or deactivate any one of the secondary UL frequencies and secondary serving HS-DSCH cells that are allowed to be activated/deactivated for 8C-HSDPA. The secondary carriers that may be activated or deactivated may be pre-defined, specified, or signaled by a high layer message such as an RRC message. For example, in addition to the HS-DSCH serving cell and the E-DCH serving cell which may not be deactivated, one or more of the secondary cells may be configured but not to be deactivated via an HS-SCCH order. With this condition, the total number of resulting activation/deactivation status of the carriers and accordingly the number of required bits are reduced. The order type $x_{odt,1}$, $x_{odt,2}$, $x_{odt,3}$='000' is currently used for activation and deactivation of DTX, DRX and HS-SCCH-less operation and for HS-DSCH serving cell change. The remaining combinations of the order type and order bits of the HS-SCCH order may be used for indicating activation and deactivation of the secondary serving HS-DSCH cells and secondary uplink frequencies that are allowed to be activated and deactivated via the HS-SCCH order. With this embodiment, a single conditioning HS-SCCH order may be used to simultaneously activate/deactivate secondary serving HS-DSCH cells and secondary uplink frequencies which are allowed to be activated/deactivated.

Table 3 shows an example order type and order mapping for activation and deactivation of the secondary serving HS-DSCH cells, in case of 8C-HSDPA with single UL carrier, assuming that the HS-DSCH serving cell (i.e., primary DL carrier), the E-DCH serving cell (i.e., primary UL carrier), and the first and second secondary serving HS-DSCH cells (i.e., first and second secondary DL carriers) are not deactivated. Table 3 may be used for activation/deactivation of 5 secondary DL carriers in 8C-HSDPA with dual UL carrier operation (DC-HSUPA) assuming that the HS-DSCH serving cell, the first and second secondary serving HS-DSCH cells, and the primary and secondary E-DCH serving cells are not deactivated. It should be noted that Table 3 is provided as an example, and the mapping between the order bits and the combination of the activation status of secondary serving HS-DSCH cells may be configured in any configurable way.

TABLE 3

| | | | | Activation Status of 3rd-7th Secondary Serving HS-DSCH cells (A = Activate, D = De-activate) | | | | |
|---|---|---|---|---|---|---|---|---|
| Order Type (xodt, 1, xodt, 2, xodt, 3) | | Order Mapping | | $3^{rd}$ Secondary Serving HS-DSCH cell | $4^{th}$ Secondary Serving HS-DSCH cell | $5^{th}$ Secondary Serving HS-DSCH cell | $6^{th}$ Secondary Serving HS-DSCH cell | $7^{th}$ Secondary Serving HS-DSCH cell |
| | $x_{ord,1}$ | $x_{ord,2}$ | $x_{ord,3}$ | | | | | |
| 001 | 0 | 0 | 0 | D | D | D | D | D |
| | 0 | 0 | 1 | D | D | D | D | A |
| | 0 | 1 | 0 | D | D | D | A | D |
| | 0 | 1 | 1 | D | D | D | A | A |
| | 1 | 0 | 0 | D | D | A | D | D |

TABLE 3-continued

| Order Type (xodt, 1, xodt, 2, xodt, 3) | Order Mapping $x_{ord,1}$ | $x_{ord,2}$ | $x_{ord,3}$ | Activation Status of 3rd-7th Secondary Serving HS-DSCH cells (A = Activate, D = De-activate) | | | | |
|---|---|---|---|---|---|---|---|---|
| | | | | $3^{rd}$ Secondary Serving HS-DSCH cell | $4^{th}$ Secondary Serving HS-DSCH cell | $5^{th}$ Secondary Serving HS-DSCH cell | $6^{th}$ Secondary Serving HS-DSCH cell | $7^{th}$ Secondary Serving HS-DSCH cell |
| | 1 | 0 | 1 | D | D | A | D | A |
| | 1 | 1 | 0 | D | D | A | A | D |
| | 1 | 1 | 1 | D | D | A | A | A |
| 010 | 0 | 0 | 0 | D | A | D | D | D |
| | 0 | 0 | 1 | D | A | D | D | A |
| | 0 | 1 | 0 | D | A | D | A | D |
| | 0 | 1 | 1 | D | A | D | A | A |
| | 1 | 0 | 0 | D | A | A | D | D |
| | 1 | 0 | 1 | D | A | A | D | A |
| | 1 | 1 | 0 | D | A | A | A | D |
| | 1 | 1 | 1 | D | A | A | A | A |
| 011 | 0 | 0 | 0 | A | D | D | D | D |
| | 0 | 0 | 1 | A | D | D | D | A |
| | 0 | 1 | 0 | A | D | D | A | D |
| | 0 | 1 | 1 | A | D | D | A | A |
| | 1 | 0 | 0 | A | D | A | D | D |
| | 1 | 0 | 1 | A | D | A | D | A |
| | 1 | 1 | 0 | A | D | A | A | D |
| | 1 | 1 | 1 | A | D | A | A | A |
| 100 | 0 | 0 | 0 | A | A | D | D | D |
| | 0 | 0 | 1 | A | A | D | D | A |
| | 0 | 1 | 0 | A | A | D | A | D |
| | 0 | 1 | 1 | A | A | D | A | A |
| | 1 | 0 | 0 | A | A | A | D | D |
| | 1 | 0 | 1 | A | A | A | D | A |
| | 1 | 1 | 0 | A | A | A | A | D |
| | 1 | 1 | 1 | A | A | A | A | A |

In another example implementation of using a single conditioning HS-SCCH order to activate and/or deactivate secondary UL frequencies and secondary serving HS-DSCH cells for 8C-HSDPA, the secondary carriers may be grouped into two sets. In the above example, the first set may include 3 secondary serving HS-DSCH cells and the second set may include 4 secondary serving HS-DSCH cells. The secondary serving HS-DSCH cells in the first set may be activated/deactivated independently without any restriction, and the secondary serving HS-DSCH cells in the second set may be activated/deactivated based on the activation status of the first set of secondary serving HS-DSCH cells. If all secondary serving HS-DSCH cells in the first set are activated, all the secondary serving HS-DSCH cells in the second set may be allowed to be activated/deactivated unconditionally. If one of the secondary serving HS-DSCH cells in the first set is deactivated, three secondary serving HS-DSCH cells in the second set may be activated/deactivated unconditionally, and the other secondary serving HS-DSCH cells in the second set may not be allowed to be activated. If two of the secondary serving HS-DSCH cells in the first set are deactivated, two secondary serving HS-DSCH cells in the second set may be activated/deactivated unconditionally, and the other two secondary serving HS-DS CH cells in the second set may not be allowed to be activated. If all three secondary serving HS-DSCH cells in the first set are deactivated, one secondary serving HS-DSCH cell in the second set may be activated/deactivated unconditionally and the other three secondary serving HS-DSCH cells in the second set may not be allowed to be activated. This example implementation gives the activation priority to the first set of the secondary serving HS-DSCH cells.

Table 4 shows an example HS-SCCH order for activation/deactivation for two sets of carriers in 8C-HSDPA+1UL wherein the activation priority is given to the first set of secondary serving HS-DSCH cells in accordance with this embodiment. It should be noted that Table 4 is provided as an example, and the mapping between the order bits and the combination of the activation status of secondary serving HS-DSCH cells may be configured in any configurable way.

TABLE 4

Activation Status of 2rd to 7th Secondary Serving HS-DSCH cells
A = Activate; D = De-activate

| | first set of secondary carriers | | | second set of secondary carriers | | | |
|---|---|---|---|---|---|---|---|
| state number | 1st secondary serving cell | 2nd secondary serving cell | 3rd secondary serving cell | 4th secondary serving cell | 5th secondary serving cell | 6th secondary serving cell | 7th secondary serving cell |
| 1 | D | D | D | D | D | D | D |
| 2 | D | D | D | A | D | D | D |
| 3 | D | D | A | D | D | D | D |
| 4 | D | D | A | D | A | D | D |
| 5 | D | D | A | A | D | D | D |
| 6 | D | D | A | A | A | D | D |
| 7 | D | A | D | D | D | D | D |
| 8 | D | A | D | D | A | D | D |
| 9 | D | A | D | A | D | D | D |
| 10 | D | A | D | A | A | D | D |
| 11 | A | D | D | D | D | D | D |
| 12 | A | D | D | D | A | D | D |
| 13 | A | D | D | A | D | D | D |
| 14 | A | D | D | A | A | D | D |
| 15 | D | A | A | D | D | D | D |
| 16 | D | A | A | D | D | A | D |

TABLE 4-continued

Activation Status of 2rd to 7th Secondary Serving HS-DSCH cells
A = Activate; D = De-activate

| | first set of secondary carriers | | | second set of secondary carriers | | | |
|---|---|---|---|---|---|---|---|
| state number | 1st secondary serving cell | 2nd secondary serving cell | 3rd secondary serving cell | 4th secondary serving cell | 5th secondary serving cell | 6th secondary serving cell | 7th secondary serving cell |
| 17 | D | A | A | D | A | D | D |
| 18 | D | A | A | D | A | A | D |
| 19 | D | A | A | A | D | D | D |
| 20 | D | A | A | A | D | A | D |
| 21 | D | A | A | A | A | D | D |
| 22 | D | A | A | A | A | A | D |
| 23 | A | D | A | D | D | D | D |
| 24 | A | D | A | D | D | A | D |
| 25 | A | D | A | D | A | D | D |
| 26 | A | D | A | D | A | A | D |
| 27 | A | D | A | A | D | D | D |
| 28 | A | D | A | A | D | A | D |
| 29 | A | D | A | A | A | D | D |
| 3 | A | D | A | A | A | A | D |
| 31 | A | A | D | D | D | D | D |
| 32 | A | A | D | D | D | A | D |
| 33 | A | A | D | D | A | D | D |
| 34 | A | A | D | D | A | A | D |
| 35 | A | A | D | A | D | D | D |
| 36 | A | A | D | A | D | A | D |
| 37 | A | A | D | A | A | D | D |
| 38 | A | A | D | A | A | A | D |
| 39 | A | A | A | D | D | D | D |
| 40 | A | A | A | D | D | D | A |
| 41 | A | A | A | D | D | A | D |
| 42 | A | A | A | D | D | A | A |
| 43 | A | A | A | D | A | D | D |
| 44 | A | A | A | D | A | D | A |
| 45 | A | A | A | D | A | A | D |
| 46 | A | A | A | D | A | A | A |
| 47 | A | A | A | A | D | D | D |
| 48 | A | A | A | A | D | D | A |
| 49 | A | A | A | A | D | A | D |
| 50 | A | A | A | A | D | A | A |
| 51 | A | A | A | A | A | D | D |
| 52 | A | A | A | A | A | D | A |
| 53 | A | A | A | A | A | A | D |
| 54 | A | A | A | A | A | A | A |

An example of assigning the order bits to the valid order states for activation and deactivation in 8C-HSDPA+1UL is shown in Table 5. It should be noted that Table 5 is provided as an example, and the mapping may be configured in any configurable way

TABLE 5

| Order Type (xodt, 1, xodt, 2, xodt, 3) | Order Mapping | | | state number |
|---|---|---|---|---|
| | $x_{ord,1}$ | $x_{ord,2}$ | $x_{ord,3}$ | |
| 001 | 0 | 0 | 0 | 1 |
| | 0 | 0 | 1 | 2 |
| | 0 | 1 | 0 | 3 |
| | 0 | 1 | 1 | 4 |
| | 1 | 0 | 0 | 5 |
| | 1 | 0 | 1 | 6 |
| | 1 | 1 | 0 | 7 |
| | 1 | 1 | 1 | 8 |
| 010 | 0 | 0 | 0 | 9 |
| | 0 | 0 | 1 | 10 |
| | 0 | 1 | 0 | 11 |
| | 0 | 1 | 1 | 12 |
| | 1 | 0 | 0 | 13 |
| | 1 | 0 | 1 | 14 |
| | 1 | 1 | 0 | 15 |
| | 1 | 1 | 1 | 16 |
| 011 | 0 | 0 | 0 | 17 |
| | 0 | 0 | 1 | 18 |
| | 0 | 1 | 0 | 19 |
| | 0 | 1 | 1 | 20 |
| | 1 | 0 | 0 | 21 |
| | 1 | 0 | 1 | 22 |
| | 1 | 1 | 0 | 23 |
| | 1 | 1 | 1 | 24 |
| 100 | 0 | 0 | 0 | 25 |
| | 0 | 0 | 1 | 26 |
| | 0 | 1 | 0 | 27 |
| | 0 | 1 | 1 | 28 |
| | 1 | 0 | 0 | 29 |
| | 1 | 0 | 1 | 30 |
| | 1 | 1 | 0 | 31 |
| | 1 | 1 | 1 | 32 |
| 101 | 0 | 0 | 0 | 33 |
| | 0 | 0 | 1 | 34 |
| | 0 | 1 | 0 | 35 |
| | 0 | 1 | 1 | 36 |
| | 1 | 0 | 0 | 37 |
| | 1 | 0 | 1 | 38 |
| | 1 | 1 | 0 | 39 |
| | 1 | 1 | 1 | 40 |
| 110 | 0 | 0 | 0 | 41 |
| | 0 | 0 | 1 | 42 |
| | 0 | 1 | 0 | 43 |
| | 0 | 1 | 1 | 44 |
| | 1 | 0 | 0 | 45 |
| | 1 | 0 | 1 | 46 |
| | 1 | 1 | 0 | 47 |
| | 1 | 1 | 1 | 48 |
| 111 | 0 | 0 | 0 | 49 |
| | 0 | 0 | 1 | 50 |
| | 0 | 1 | 0 | 51 |
| | 0 | 1 | 1 | 52 |
| | 1 | 0 | 0 | 53 |
| | 1 | 0 | 1 | 54 |
| | 1 | 1 | 0 | reserved |
| | 1 | 1 | 1 | reserved |

In order to maintain the backward compatibility to Release 10 4C-HSDPA, for 8C-HSDPA with DC-HSUPA operation, a new secondary serving HS-DSCH cell may be activated/deactivated in addition to the secondary serving HS-DSCH cells that may be activated/deactivated in R10 4C-HSDPA operation by introducing a new order type. This implementation is based on the assumption that the other secondary serving HS-DSCH cells beyond the third secondary serving HS-DSCH cell may not be deactivated in 8C-HSDPA. The new secondary serving HS-DSCH cell to be activated/deactivated may be pre-defined or signaled by a high layer message. This embodiment may be used for the case that the new secondary serving HS-DSCH cells is the HS-DSCH cell that is configured in one band or belongs to the other mobile operator when two or more mobile operators share their spectrum.

In accordance with another embodiment, some of the secondary serving HS-DSCH cells may be activated/deactivated as a group. For MC-HSDPA operations, if more than four DL carriers are configured, in order to maintain the backwards compatibility to R10 4C-HSDPA, the activation/deactivation of the first three secondary DL serving HS-DSCH cells and the first secondary UL frequency may be activated by the HS-SCCH orders as defined for 4C-HSDPA, and the activation/deactivation of the secondary serving HS-DSCH cells beyond the first three secondary serving HS-DSCH cells may be performed as a group (one or more groups).

All configured secondary carriers beyond the first three secondary DL carriers may be activated/deactivated as a group. For example, in 8C-HSDPA, the group of secondary serving HS-DSCH cells from the fourth to seventh secondary serving HS-DSCH cells may be simultaneously activated/deactivated as a group. Table 6 shows an example implementation in accordance with this embodiment while maintaining the backward compatibility to R10 4C-HSDPA and DC-HSUPA. It should be noted that Table 6 is provided as an example, and the command-to-bit mapping may be configured in any configurable way.

or '111'. The serving HS-DSCH cell group may be defined in accordance with any embodiments disclosed above.

Alternatively, the individual secondary carriers within the specified group may be further activated/deactivated using a separate message (e.g., a new HS-SCCH order). One or more new order types may be defined for this purpose. Each carrier in the group is then individually activated/deactivated by the order bits. For example, as shown in Table 7, two order types may be used to indicate the activation/deactivation states of the individual secondary serving HS-DSCH cells of the group of secondary serving HS-DSCH cells that is controlled by the last column of Table 6. It should be

TABLE 6

HS-SCCH order for activation/deactivation of the Secondary carriers in 8C-HSDPA

| Order Type (xodt, 1, xodt, 2, xodt, 3) | Order Mapping | | | $1^{st}$ Secondary Serving HS-DSCH cell | $2^{nd}$ Secondary Serving HS-DSCH cell | $3^{rd}$ Secondary Serving HS-DSCH cell | Secondary UL Frequency | $4^{th}$-$7^{th}$ (group) Secondary Serving HS-DSCH cell |
|---|---|---|---|---|---|---|---|---|
| | $x_{ord,1}$ | $x_{ord,2}$ | $x_{ord,3}$ | | | | | |
| 001 | 0 | 0 | 0 | D | D | D | D | D |
| | 0 | 0 | 1 | A | D | D | D | D |
| | 0 | 1 | 1 | A | D | D | A | D |
| | 0 | 1 | 0 | D | A | D | D | D |
| | 1 | 0 | 0 | A | A | D | D | D |
| | 1 | 0 | 1 | A | A | D | A | D |
| | 1 | 1 | 0 | D | D | A | D | D |
| | 1 | 1 | 1 | A | D | A | D | D |
| 010 | 0 | 0 | 0 | A | D | A | A | D |
| | 0 | 0 | 1 | D | A | A | D | D |
| | 0 | 1 | 0 | A | A | A | D | D |
| | 0 | 1 | 1 | A | A | A | A | D |
| | 1 | 0 | 0 | D | D | D | D | A |
| | 1 | 0 | 1 | A | D | D | D | A |
| | 1 | 1 | 0 | A | D | D | A | A |
| | 1 | 1 | 1 | D | A | D | D | A |
| 011 | 0 | 0 | 0 | A | A | D | D | A |
| | 0 | 0 | 1 | A | A | D | A | A |
| | 0 | 1 | 0 | D | D | A | D | A |
| | 0 | 1 | 1 | A | D | A | D | A |
| | 1 | 0 | 0 | A | D | A | A | A |
| | 1 | 0 | 1 | D | A | A | D | A |
| | 1 | 1 | 0 | A | A | A | D | A |
| | 1 | 1 | 1 | A | A | A | A | A |

Alternatively, all configured secondary serving HS-DSCH cells beyond the first three secondary serving HS-DSCH cells may be activated/deactivated as several groups by introducing a more order type than those in Table 6. For example, one or more of new order types may be introduced such that $x_{odt,1}$, $x_{odt,2}$, $x_{odt,3}$='100', '101', '110', understood that Table 7 is provided as an example, and the command-to-bit mapping combination of the carrier configurations may be defined in any configurable way. It should be understood that the actual combination of secondary serving HS-DSCH cell configuration defined for each command may take a different form in Table 7.

TABLE 7

| Order Type (xodt, 1, xodt, 2, xodt, 3) | Order Mapping | | | Activation Status of Secondary Serving HS-DSCH cells (A = Activated; D = De-activated) | | | |
|---|---|---|---|---|---|---|---|
| | | | | $4^{th}$ Secondary Serving HS-DSCH cell | $5^{th}$ Secondary Serving HS-DSCH cell | $6^{th}$ Secondary Serving HS-DSCH cell | $7^{th}$ Secondary Serving HS-DSCH cell |
| | $x_{ord,1}$ | $x_{ord,2}$ | $x_{ord,3}$ | | | | |
| 100 | 0 | 0 | 0 | D | D | D | D |
| | 0 | 0 | 1 | A | D | D | D |

TABLE 7-continued

| Order Type (xodt, 1, xodt, 2, xodt, 3) | Order Mapping | | | Activation Status of Secondary Serving HS-DSCH cells (A = Activated; D = De-activated) | | | |
|---|---|---|---|---|---|---|---|
| | $x_{ord,1}$ | $x_{ord,2}$ | $x_{ord,3}$ | $4^{th}$ Secondary Serving HS-DSCH cell | $5^{th}$ Secondary Serving HS-DSCH cell | $6^{th}$ Secondary Serving HS-DSCH cell | $7^{th}$ Secondary Serving HS-DSCH cell |
| | 0 | 1 | 1 | D | A | D | D |
| | 0 | 1 | 0 | A | A | D | D |
| | 1 | 0 | 0 | D | D | A | D |
| | 1 | 0 | 1 | A | D | A | D |
| | 1 | 1 | 0 | D | A | A | D |
| | 1 | 1 | 1 | A | A | A | D |
| 101 | 0 | 0 | 0 | D | D | D | A |
| | 0 | 0 | 1 | A | D | D | A |
| | 0 | 1 | 0 | D | A | D | A |
| | 0 | 1 | 1 | A | A | D | A |
| | 1 | 0 | 0 | D | D | A | A |
| | 1 | 0 | 1 | A | D | A | A |
| | 1 | 1 | 0 | D | A | A | A |
| | 1 | 1 | 1 | A | A | A | A |

When receiving the group activation (or deactivation) order (e.g., as indicated by the last column of Table 6), the UE may activate (or deactivate) all the secondary serving HS-DSCH cells belonging to that group (as configured). The UE may further receive activation/deactivation order for individual secondary serving HS-DSCH cells within the group, (e.g., as provided by the entries in Table 7). The UE then applies the appropriate activation/deactivation to the concerned secondary serving HS-DSCH cells.

When the UE simultaneously receives conflicting group order and individual order for a targeted secondary serving HS-DSCH cells within a group, (i.e., orders for activation and deactivation of the same HS-DSCH cell are received during the same subframe), the UE may follow the group order (e.g., the order from Table 6) to activate/deactivate the targeted carrier within that group. Alternatively, the UE may follow the individual order (e.g., the order from Table 7) to activate/deactivate the targeted carrier within that group. Alternatively, the UE may not change the activation status of the targeted carrier within that group by ignoring the conflicting orders. Alternatively, the UE behavior may be unspecified.

Upon reception of the group deactivation order, the UE may deactivate all secondary serving HS-DSCH cells in the group. Upon group activation, the UE may resume the activation/deactivation state of the secondary serving HS-DSCH cells in the group before the group deactivation order was received. Upon reception of another group activation order following the previous group activation order, (i.e., two successive group activation orders without group deactivation orders in between), the UE may activate all secondary serving HS-DSCH cells in the group, irrespective of the activation/deactivation status prior to the reception of the group deactivation order.

Alternatively, two independent HS-SCCH orders may be simultaneously signaled to explicitly activate/deactivate all secondary serving HS-DSCH cells and secondary uplink frequencies in 8C-HSDPA while maintaining the backward compatibility with Release 10 4C-HSDPA+DC-HSUPA. Table 8 shows an example implementation of signaling HS-SCCH orders for activation/deactivation of the secondary serving HS-DSCH cells and secondary uplink frequencies in 8C-HSDPA+DC-HSUPA.

In this example, on top of the conventional order type for 4C-HSDPA ($x_{odt,1}$, $x_{odt,2}$, $x_{odt,3}$='001' and '010'), two more new order types, (i.e., $x_{odt,1}$, $x_{odt,2}$, $x_{odt,3}$='011' and '100'), may be defined to indicate the activation/deactivation states of the four additional secondary DL carriers ($4^{th}$ to $7^{th}$ secondary serving HS-DSCH cells). To individually activate/deactivate all configured secondary carriers for 8C-HSDPA+DC-HSUPA, two HS-SCCH orders may be respectively chosen from the unshaded area and the shaded area, respectively. One HS-SCCH order from outside the block, (i.e., out of the range defined by "order type" and "order"="010 100" to "100 011"), in Table 8 is used to activate/deactivate the secondary serving HS-DSCH cells and secondary uplink frequency configured for 4C-HSDPA to maintain the backwards compatibility with Release 10, and the other HS-SCCH order from the block, (i.e., the range defined by "order type" and "order"="010 100" to "100 011"), in Table 8 is used to activate/deactivate the four additional secondary DL carriers for 8C-HSDPA, (i.e., from the 4th to the 7th secondary serving HS-DSCH cells). "NA" in Table 8 means that the HS-SCCH order is not applied to, (i.e., not used to activate/deactivate), the corresponding secondary serving HS-DSCH cells and secondary uplink frequency. It should be noted that Table 8 is provided as an example, and the command-to-bit mapping may be defined in any configurable way.

TABLE 8

| HS-SCCH order for activation/deactivation of the Secondary serving HS-DSCH cells and secondary uplink frequency in 8C-HSDPA | | | | | | | | | | | |
|---|---|---|---|---|---|---|---|---|---|---|---|
| Order Type (xodt, 1, xodt, 2, xodt, 3) | Order Mapping | | | Activation Status of Secondary Serving HS-DSCH cells and Secondary UL Frequency A = Activate; D = De-activate; NA = Not Applied; | | | | | | | |
| | $X_{ord\,1}$ | $X_{ord\,2}$ | $X_{ord\,3}$ | 1st Secondary Serving HS-DSCH cell | 2nd Secondary Serving HS-DSCH cell | 3rd Secondary Serving HS-DSCH cell | Secondary UL Frequency | 4th Secondary Serving HS-DSCH cell | 5th Secondary Serving HS-DSCH cell | 6th Secondary Serving HS-DSCH cell | 7th Secondary Serving HS-DSCH cell |
| 001 | 0 | 0 | 0 | D | D | D | D | NA | NA | NA | NA |
| | 0 | 0 | 1 | A | D | D | D | NA | NA | NA | NA |
| | 0 | 1 | 1 | A | D | D | A | NA | NA | NA | NA |
| | 0 | 1 | 0 | D | A | D | D | NA | NA | NA | NA |
| | 1 | 0 | 0 | A | A | D | D | NA | NA | NA | NA |
| | 1 | 0 | 1 | A | A | D | A | NA | NA | NA | NA |
| | 1 | 1 | 0 | D | D | A | D | NA | NA | NA | NA |
| | 1 | 1 | 1 | A | D | A | D | NA | NA | NA | NA |
| 010 | 0 | 0 | 0 | A | D | A | A | NA | NA | NA | NA |
| | 0 | 0 | 1 | D | A | A | D | NA | NA | NA | NA |
| | 0 | 1 | 0 | A | A | A | D | NA | NA | NA | NA |
| | 0 | 1 | 1 | A | A | A | A | NA | NA | NA | NA |
| | 1 | 0 | 0 | NA | NA | NA | NA | D | D | D | D |
| | 1 | 0 | 1 | NA | NA | NA | NA | A | D | D | D |
| | 1 | 1 | 0 | NA | NA | NA | NA | D | A | D | D |
| | 1 | 1 | 1 | NA | NA | NA | NA | A | A | D | D |
| 011 | 0 | 0 | 0 | NA | NA | NA | NA | D | D | A | D |
| | 0 | 0 | 1 | NA | NA | NA | NA | A | D | A | D |
| | 0 | 1 | 0 | NA | NA | NA | NA | D | A | A | D |
| | 0 | 1 | 1 | NA | NA | NA | NA | A | A | A | D |
| | 1 | 0 | 0 | NA | NA | NA | NA | D | D | D | A |
| | 1 | 0 | 1 | NA | NA | NA | NA | A | D | D | A |
| | 1 | 1 | 0 | NA | NA | NA | NA | D | A | D | A |
| | 1 | 1 | 1 | NA | NA | NA | NA | A | A | D | A |
| 100 | 0 | 0 | 0 | NA | NA | NA | NA | D | D | A | A |
| | 0 | 0 | 1 | NA | NA | NA | NA | A | D | A | A |
| | 0 | 1 | 0 | NA | NA | NA | NA | D | A | A | A |
| | 0 | 1 | 1 | NA | NA | NA | NA | A | A | A | A |
| | 1 | 0 | 0 | Unused (Reserved) | | | | | | | |
| | 1 | 0 | 1 | Unused (Reserved) | | | | | | | |
| | 1 | 1 | 0 | Unused (Reserved) | | | | | | | |
| | 1 | 1 | 1 | Unused (Reserved) | | | | | | | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method applied in a wireless transmit/receive unit (WTRU) for performing discontinuous reception (DRX), the method comprising:

receiving, by the WTRU, first DRX configuration information associated with a first cell group and second DRX configuration information associated with a second cell group, wherein the first cell group includes a plurality of cells and the second cell group includes a different plurality of cells;

receiving, by the WTRU, a first DRX control message associated with the first cell group, wherein the first DRX control message associated with the first cell group indicates that the WTRU is to start DRX specifically for the first cell group;

starting, by the WTRU, DRX specifically for the first cell group and not for the second cell group based on the receipt of the first DRX configuration information associated with the first cell group and on the receipt of the first DRX control message associated with the first cell group; and monitoring, by the WTRU, the second cell group while DRX for the first cell group is active based on the receipt of the second DRX configuration information associated with the second cell group.

2. The method of claim 1, wherein each of the first cell group and second cell group include a primary cell and one or more secondary cells.

3. The method of claim 1, wherein the first DRX configuration information includes a first DRX cycle length and the second DRX configuration information includes a second DRX cycle length.

4. The method of claim 1, wherein the first DRX configuration information includes a first DRX cycle length and a second DRX cycle length and the second DRX configuration information includes a third DRX cycle length and a fourth DRX cycle length.

5. The method of claim 1, further comprising:
receiving, by the WTRU, a second DRX control message associated with the second cell group, wherein receipt of the second DRX control message associated with the second cell group indicates that the WTRU is to start DRX for the second cell group; and
starting, by the WTRU, DRX specifically for the second cell group and not for the first cell group based on the receipt of the second DRX configuration information associated with the second cell group and on the receipt of the second DRX control message associated with the second cell group.

6. The method of claim 5, wherein a DRX pattern for the first cell group is different than a DRX pattern for the second cell group.

7. The method of claim 1, wherein the first DRX control message associated with the first cell group is a high-speed shared control channel (HS-SCCH) order.

8. The method of claim 1, wherein the WTRU is a long term evolution (LTE) WTRU.

9. A wireless transmit/receive unit (WTRU) for performing discontinuous reception (DRX), the WTRU comprising:
a receiver; and
a processor operatively coupled to the receiver; wherein:
the receiver and the processor are configured to receive first DRX configuration information associated with a first cell group and second DRX configuration information associated with a second cell group, wherein the first cell group includes a plurality of cells and the second cell group includes a different plurality of cells;
the receiver and the processor are further configured to receive a first DRX control message associated with the first cell group, wherein the first DRX control message associated with the first cell group indicates that the WTRU is to start DRX specifically for the first cell group;
the processor is further configured to start DRX specifically for the first cell group and not for the second cell group based on the receipt of the first DRX configuration information associated with the first cell group and on the receipt of the first DRX control message associated with the first cell group; and
the receiver and the processor are further configured to monitor the second cell group while DRX for the first cell group is active based on the receipt of the second DRX configuration information associated with the second cell group.

10. The WTRU of claim 9, wherein each of the first cell group and second cell group include a primary cell and one or more secondary cells.

11. The WTRU of claim 9, wherein the first DRX configuration information includes a first DRX cycle length and the second DRX configuration information includes a second DRX cycle length.

12. The WTRU of claim 9, wherein the first DRX configuration information includes a first DRX cycle length and a second DRX cycle length and the second DRX configuration information includes a third DRX cycle length and a fourth DRX cycle length.

13. The WTRU of claim 9, further comprising:
the receiver and the processor are further configured to receive a second DRX control message associated with the second cell group, wherein receipt of the second DRX control message associated with the second cell group indicates that the WTRU is to start DRX for the second cell group; and
the receiver and the processor are further configured to start DRX specifically for the second cell group and not for the first cell group based on the receipt of the second DRX configuration information associated with the second cell group and the receipt of the second DRX control message associated with the second cell group.

14. The WTRU of claim 13, wherein a DRX pattern for the first cell group is different than a DRX pattern for the second cell group.

15. The WTRU of claim 9, wherein the first DRX control message associated with the first cell group is a high-speed shared control channel (HS-SCCH) order.

16. The WTRU of claim 9, wherein the WTRU is a long term evolution (LTE) WTRU.

17. The method of claim 1, further comprising:
individually, for cells within the second cell group, cease monitoring, by the WTRU, control channels.

18. The method of claim 17, wherein the individually, for cells within the second cell group, cease monitoring control channels is in response to individually deactivating the cells within the second cell group.

19. The method of claim 18, wherein a cell of the cells within the second cell group is individually deactivated based on a deactivation timer.

20. The method of claim 18, wherein a cell of the cells within the second cell group is individually deactivated based on a deactivation command.

21. The WTRU of claim 9, further comprising:
the receiver and the processor are further configured to individually, for cells within the second cell group, cease monitoring control channels.

22. The WTRU of claim 21, wherein the individually, for cells within the second cell group, cease monitoring control channels is in response to individually deactivating the cells within the second cell group.

23. The WTRU of claim 22, wherein a cell of the cells within the second cell group is individually deactivated based on a deactivation timer.

24. The WTRU of claim 22, wherein a cell of the cells within the second cell group is individually deactivated based on a deactivation command.

25. The method of claim 1, wherein the first DRX configuration information associated with the first cell group and second DRX configuration information associated with the second cell group are received in a first transmission, and wherein the first DRX control message associated with the first cell group is received in a second transmission.

26. The WTRU of claim 9, wherein the first DRX configuration information associated with the first cell group and second DRX configuration information associated with the second cell group are received in a first transmission, and wherein the first DRX control message associated with the first cell group is received in a second transmission.

* * * * *